United States Patent
Funatsu

[11] Patent Number: 5,953,160
[45] Date of Patent: Sep. 14, 1999

[54] BINOCULAR

[75] Inventor: Gouji Funatsu, Tokyo, Japan

[73] Assignee: Asahi Kogaku Kogyo Kabushiki Kaisha, Toyko, Japan

[21] Appl. No.: 09/049,045

[22] Filed: Mar. 27, 1998

Related U.S. Application Data

[62] Division of application No. 08/702,091, Aug. 23, 1996.

[30] Foreign Application Priority Data

| Aug. 24, 1995 | [JP] | Japan | 7-239091 |
| Aug. 24, 1995 | [JP] | Japan | 7-239297 |
| Aug. 24, 1995 | [JP] | Japan | 7-239298 |
| Aug. 24, 1995 | [JP] | Japan | 7-239299 |
| Aug. 24, 1995 | [JP] | Japan | 7-239300 |
| Aug. 24, 1995 | [JP] | Japan | 7-239301 |
| Aug. 24, 1995 | [JP] | Japan | 7-239302 |
| Aug. 24, 1995 | [JP] | Japan | 7-239303 |
| Aug. 24, 1995 | [JP] | Japan | 7-239304 |
| Aug. 24, 1995 | [JP] | Japan | 7-239305 |
| Aug. 24, 1995 | [JP] | Japan | 7-239306 |

[51] Int. Cl.$^6$ .......................... G02B 21/00; G03B 11/04
[52] U.S. Cl. .......................... 359/612; 359/511; 359/600
[58] Field of Search .......................... 359/399, 402, 359/405–407, 503, 506, 507–508, 511, 410, 600, 411, 611–612; 396/529–534

[56] References Cited

U.S. PATENT DOCUMENTS

| 4,605,288 | 8/1986 | White | 359/414 |
| 4,616,907 | 10/1986 | Nakamura | 359/414 |
| 4,926,560 | 5/1990 | Kilgore et al. | 359/612 |
| 5,062,698 | 11/1991 | Funatsu | 359/414 |
| 5,071,242 | 12/1991 | Yanagisawa | 359/416 |
| 5,191,471 | 3/1993 | Funatsu | 359/414 |
| 5,227,916 | 7/1993 | Theirl et al. | 359/612 |
| 5,448,405 | 9/1995 | Clausen et al. | 359/609 |
| 5,583,692 | 12/1996 | Funatsu | 359/422 |
| 5,615,044 | 3/1997 | Dross | 359/418 |

FOREIGN PATENT DOCUMENTS

| 48-75637 | 9/1973 | Japan | 359/611 |
| 61-15111 | 1/1986 | Japan . | |
| 1-34165 | 10/1989 | Japan . | |
| 2-16326 | 5/1990 | Japan . | |

*Primary Examiner*—Thong Nguyen
*Attorney, Agent, or Firm*—Greenblum & Bernstein, PLLC

[57] ABSTRACT

A binocular includes two telescope systems with parallel axes, eyepiece frames, adjustable eye cups, operation controls placed between the telescope systems, a focus adjustment mechanism, a diopter correction mechanism, and a magnifying-power-varying mechanism. The magnifying-power-varying mechanism includes rotatable cam rings and guide rings connected by a single connecting belt that moves perpendicular to the optical axes to rotate the cam rings. The frame of the rearmost lens of each eyepiece optical system includes an end surface facing a user that has a predetermined concave curvature. An eye cup locking mechanism is provided that securely locks each eye cup to a respective barrel of the binocular.

3 Claims, 25 Drawing Sheets

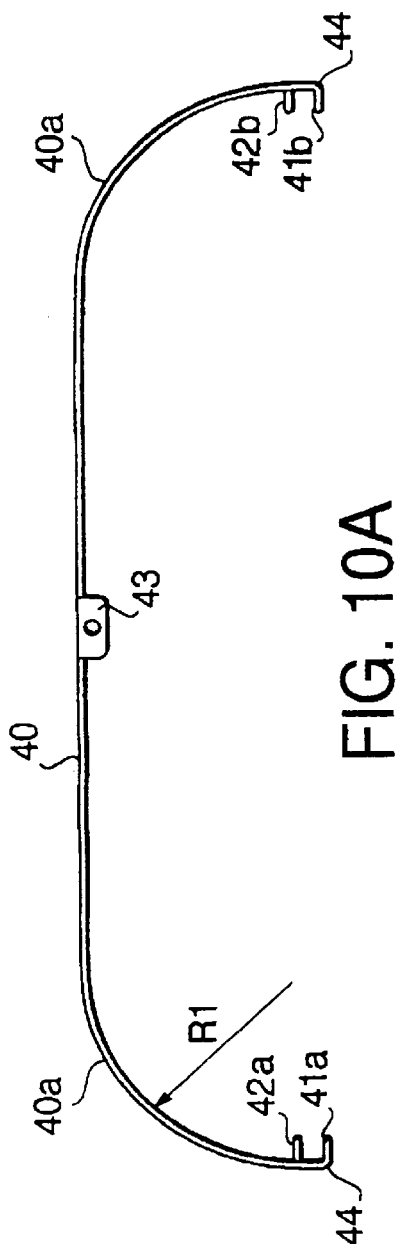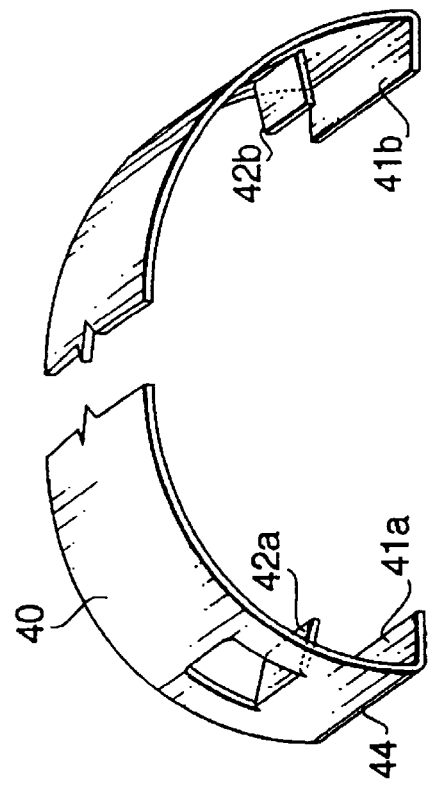

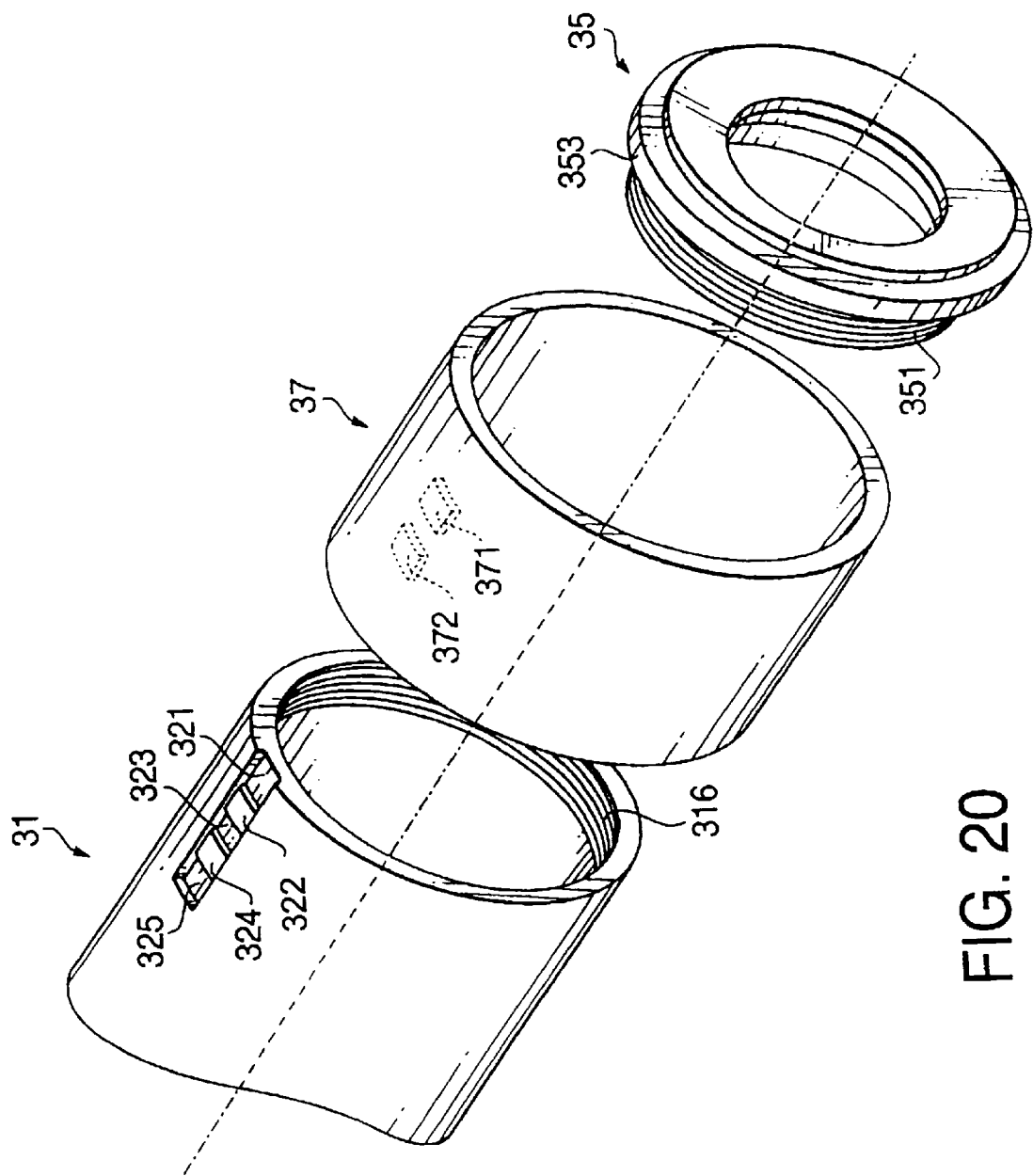

BINOCULAR

This application is a divisional of application Ser. No. 08/702,091, filed Aug. 23, 1996, the contents of which are herein incorporated by reference in its entirety.

BACKGROUND OF THE INVENTION

The present invention relates to a binocular.

A conventional binocular includes two telescope systems that have parallel optical axes, an interpupillary adjustment mechanism, a focus adjustment mechanism, a magnifying-power-varying mechanism, and a diopter correction mechanism.

The conventional interpupillary adjustment mechanism is provided so that the left and right telescope systems are rotatable about a shaft provided to the center of the left and right telescope systems.

Conventionally, the magnifying-power-varying mechanism includes a lens group designated as a magnifying-power-varying lens group provided in the left and right telescope systems and operates to move the magnifying-power-varying lens groups along the optical axes thereof. The magnifying-power-varying lens groups are moved by driving members provided in the left and right telescope systems.

Since the interaxial distance between the left and right telescope systems is varied by the interpupillary adjustment, in order to simultaneously vary the magnification power of both the left and right telescope systems, the driving members are connected by a connecting member, such as string. A magnifying-power-varying activator, for example a knob, is provided on one of the telescope systems, usually on the right telescope system, to allow the user to actuate the driving members. The operation of the magnifying-power-varying activator moves the right driving member, and the movement of the right driving member is transmitted to the left driving member by the connecting member.

However, if the magnifying-power-varying activator is provided on the right viewer portion, it is inconvenient for a left-handed user. A binocular should be easily operated by both right-handed and left-handed users.

Further, in a conventional binocular the driving members and connecting member are arranged in a complicated manner using pulleys or the like, which makes the assembly of the binocular complicated. Also, often there is a difference between the axial position of the driving members and the axial position of the connecting member, such that the connecting member is not perpendicular with respect to the rotation axes of the driving members. In such an arrangement, the connecting member may not move smoothly and has a greater potential to bind or fail. Accordingly, a simple means of synchronizing the movement of both driving members and therefore both magnifying-power-varying lenses is desirable.

Furthermore, conventionally, the position of the magnifying-power-varying lenses with respect to the rotation of the driving members is not adjustable. Therefore, a binocular wherein the position of the magnifying-power-varying lenses with respect to the driving members can be adjusted is desirable.

Conventionally, the driving members for the magnifying-power-varying mechanism are cam rings and guide rings. In such an arrangement, lens frames that support the magnifying-power-varying lenses include cam pins, and each cam pin is inserted through both a guide groove on the guide ring and a cam groove on the cam ring. If an excessive driving force is applied to the cam pins, the lens frames may break. Accordingly, a binocular must be designed to prevent the lens frames from breaking when an excessive force is applied to the cam pins.

Further, in a conventional binocular, if there is a difference between the visual fields seen through the left and right telescope systems, because of a lens mounting error or the like, replacement of the faulty lens is necessary. Accordingly, a binocular wherein the position of an improperly mounted lens can be adjusted to correct for a difference between the visual fields of the telescope systems is desirable.

A conventional binocular also has adjustable eye cups, which are slidable between a projected position and a retracted position. A spectacle-wearing user can use the binocular with the eye cup retracted, allowing the spectacle lenses to be closer to the telescope systems. The eye cups have a locking mechanism to keep them in position, generally including two holes formed on the eye cup and one protrusion formed on the viewer portion, such that the protrusion locks into one of the two holes for each position. However, if too much force is applied to the eye cup this locking mechanism is unstable and the eye cup can be accidentally moved from the extended position to the retracted position.

Conventionally, the end surface of an eyepiece frame that is facing the user has a flat cross-section such that a further problem is that, if the user wears spectacles, the curvature of the spectacle lenses may interfere with the flat end surface of the eyepiece frame.

SUMMARY OF THE INVENTION

It is therefore an object of the present invention to provide an improved binocular, and more specifically to provide a binocular that is easily operated by both left-handed and right-handed users.

According to an aspect of the present invention, a binocular includes:

two telescope systems having parallel optical axes;

a focus adjusting mechanism for focusing the telescope systems;

a diopter correction mechanism for adjusting a diopter of the telescope systems relative to each other;

a magnifying-power-varying mechanism for adjusting the magnifying-power of the telescope systems; and operation controllers for operating the focus adjusting mechanism, the diopter correction mechanism, and the magnifying-power-varying mechanism. The operation controllers are centered between the two telescope systems.

Since the operation controllers are centered, they are equally accessible to left-handed and right-handed users.

In a particular arrangement, the operation controllers are rotatable about a coaxial rotation axis for driving the focus adjusting mechanism, the diopter correction mechanism, and the magnifying-power-varying mechanism.

Preferably, the rotation axis of the three operation controllers is parallel to the optical axes of the telescope systems in order to allow a more compact binocular design.

In this aspect, each of the telescope systems of the binocular includes a lens group designated as a magnifying-power-varying lens group, and the magnifying-power-varying mechanism includes: drive members that are rotatable about the optical axes in order to move the magnifyingpower-varying lens groups along the optical axes; and a connecting member that synchronously rotates the drive members in response to activation of the magnifying-power-varying mechanism.

Preferably, the connecting member is a belt-shaped material having a predetermined rigidity, and the longitudinal ends of the connecting member are fixed to the drive members so that when the connecting member is driven perpendicular to the optical axes, the connecting member pushes the outer surface of one of the drive members and pulls the outer surface of the other of the drive members thereby rotating both of the drive members at the same time.

Advantageously, the magnifying-power-varying mechanism further includes rollers and guide members that support and guide the connecting member.

Using a single connecting member that is supported and guided by simple devices decreases the chances of the connecting member binding and simplifies assembly.

In particular, if each of the telescope systems includes an object optical system and an eyepiece optical system, and an object optical axis of a frontmost lens of the object lens system and an eyepiece optical axis of the eyepiece optical system being parallel but not coaxial, at least the eyepiece optical systems being rotatable about the object optical axes for interpupillary adjustment, the rollers are positioned to support the connecting member at the object optical axes during the interpupillary adjustment so that the magnifying-power-varying mechanism is not affected by the interpupillary adjustment.

In a further development of this aspect of the present invention:

the operation controllers are first, second and third operation knobs;

the focus adjustment mechanism includes a first actuator and a second actuator which are parallel to the optical axes and which are driven along the optical axes by the first operation knob;

the diopter correcting mechanism shares the second actuator with the focus adjustment mechanism such that rotation of the second operation knob only drives the second actuator;

and the magnifying-power-varying mechanism further includes a third actuator that is driven by the third operation knob to move perpendicular to the optical axes and drive the connecting member.

In particular, when using the focus adjustment mechanism, the axial movement of the first actuator moves the frontmost lens of the object optical system of a first telescope system, and the axial movement of the second actuator moves the frontmost lens of the object optical system of a second telescope system along the optical axes. Further, when using the diopter correction mechanism, the second actuator is driven to move the frontmost lens of the object optical system of a second telescope system with respect to the frontmost lens of the object optical system of a first telescope system.

In a particular arrangement, the third operation knob is provided between the first and second operation knobs, and the second actuator is inserted through the third operation knob into the first actuator.

Preferably, the second operation knob (for the diopter correction mechanism) is storable into and extendable from at least one of the first and third operation knobs. Diopter correction is generally performed less frequently and thus the ability to store this operation knob makes the binocular more compact and lessens the chance that the diopter correction mechanism will be operated accidentally.

Also preferably, the focus adjusting mechanism includes a first arm and second arm that respectively engage lens frames holding the focusing lenses in the telescope systems. The first arm and the second arm are guided parallel to the optical axes by a guiding mechanism provided in the binocular. Further, each of the first arm and the second arm include a hole which contains a biasing member, such as a spring, which comes into contact with the lens frames to regulate their vertical position.

A binocular according to this aspect is compact and easy to assemble and includes a simple magnifying-power-varying mechanism which is not affected by interpupillary adjustment and in which there is little chance of the connecting member binding during movement.

It is another object of the present invention to provide a binocular that is compact.

According to another aspect of the present invention, the binocular includes.

two telescope systems having parallel optical systems, each telescope system including a lens group designated as a magnifying-power-varying lens group; and a magnifying-power-varying mechanism for moving the magnifying-power-varying lens groups.

The magnifying-power-varying mechanism includes drive members in each telescope system and a connecting member that connects the drive members.

The drive members are rotatable around the optical axes to move the magnifying-power-varying lens groups along the optical axes.

The connecting member is made of a belt-shaped material having a predetermined rigidity, and its longitudinal ends are fixed to outer surfaces of the drive members. In this way, when the connecting member is driven perpendicular to the optical axes, the connecting member pushes the outer surface of one of the drive members and pulls the outer surface of the other of the drive members thereby to rotate both of the drive members.

Preferably, the connecting member has an engaging portion at both longitudinal ends that engages with the drive members. In a particular arrangement, each of the engaging portions includes a bent portion at the longitudinal end of the connecting member and a tongue portion formed at a predetermined distance from the bent portion. Further, the bent portion has a rounded corner to reduce the chances of the connecting member binding during movement.

A particular connecting member is made of metal, for example, Ni—Cr—Mo alloy.

A binocular according to this aspect includes a simple magnifying-power-varying mechanism in which there is little chance of the connecting member binding.

Further, the magnifying-power-varying mechanism is further defined in that the drive members have slits for engaging the bent portions and the tongue portions.

In particular, the tongue portions are formed as a rectangle cut and bent out from the connecting member. Further, the distance between each bent portion and each tongue portion is less than the distance between the slits on each drive member, so that the bent portion and the tongue portion clamp the connecting member to the drive members.

Preferably, to further secure the connecting member to the drive members, a predetermined length of the connecting member is wrapped around each drive member.

For easier assembly, the slits of each drive member have openings, at one longitudinal end surface of the drive member, for inserting the bent portion and the tongue portion. Preferably, the slits have a flared opening for inserting the bent portion and the tongue portion.

In yet a further development of this aspect, the drive members include drive rings that are rotatably provided for axially moving the magnifying-power-varying lens groups, and the connecting member attaches to and synchronously rotates the drive rings. Further, a regulating member regulates the position of the connecting member in a direction parallel to the optical axes.

In a particular arrangement, the regulating member includes regulating plates provided in front of the connecting member. Preferably, the regulating plate also contacts reference surfaces of the drive rings to regulate the drive rings in the same direction.

In this way, the drive rings are kept in position and the connecting member is prevented from binding due to twisting away from it axis of movement (that is, perpendicular to the optical axes).

It is still another object of the present invention to provide a binocular that is easy to assemble.

According to still another aspect of the present invention, each of the telescope systems includes an object optical system and an eyepiece optical system, an object optical axis of a frontmost lens of the object optical system and an eyepiece optical axis of the eyepiece optical system are parallel, but not coaxial. Further, the eyepiece optical system of each telescope system is rotatable about the object optical axis for interpupillary adjustment.

In this aspect, for easier assembly, a first unit includes at least frontmost lenses of the object optical systems, and a second unit includes at least eyepiece optical systems. Thus, each unit can be assembled separately and then be simply connected to each other.

Further, the first unit further includes erecting systems and the second unit further includes the remaining lens groups of the object optical systems other than the frontmost lenses.

In a particular arrangement, each telescope system has a magnifying-power-varying lens group. The magnifying-power-varying lens group includes the remaining lens group of each object lens system other than the frontmost lens and lens group of the objective side of the eyepiece optical system.

Assembly is further simplified if, by assembling the second unit to the first unit, the position (along the optical axes) of the components of the second unit are determined by the positions of the components of the first unit.

It is yet another object of the present invention to provide a binocular in which the binding of a connecting member between driving members can be prevented.

According to yet another aspect of the present invention, each of the telescope systems includes an object optical system and an eyepiece optical system, an object optical axis of a frontmost lens of the object optical system and an eyepiece optical axis of the eyepiece optical system are parallel but not coaxial. Further, the eyepiece optical systems are rotatable about the object optical axes for interpupillary adjustment. Each telescope system further includes a lens group designated as a magnifying-power-varying lens group.

The magnifying-power-varying mechanism is for moving the magnifying-power-varying lens groups and includes drive members, a connecting member and at least one regulating member.

The drive members include drive rings rotatably provided for axially moving the magnifying-power-varying lens groups. The connecting member is belt-shaped and synchronously rotates the drive rings. The regulating member regulates the position of the connecting member within a predetermined range in a direction parallel to the optical axes.

In this aspect, for easier assembly, a first unit includes at least the frontmost lens of the object optical systems and a second unit includes the eyepiece optical systems.

The second unit further includes:
rear barrels for supporting remaining lens groups of the object optical system other than the frontmost lenses and lens groups of objective side of eyepiece optical systems.
a support frame for supporting the rear barrels with a predetermined margin for adjustment in the direction of the eyepiece optical axes; and
the magnifying-power-varying mechanism.

Since the second unit includes all the necessary elements for the assembly of the magnifying-power-varying mechanism with the telescope systems, the second unit can be completely assembled independently of the first unit and then simply attached to the first unit.

As in other aspects of the invention, the connecting member has a predetermined rigidity and its longitudinal ends are fixed to the outer surfaces of the drive rings such that when the connecting member is driven perpendicular to the optical axes, the connecting member pushes the outer surface of one of the drive rings and pulls the outer surface of the other of the drive rings thereby rotating both of the drive rings at the same time.

Further, the regulating member includes a regulating plate provided in front of the connecting member which also contacts a reference surface of each drive ring to thereby also regulate the positions of the connecting member and the drive rings along the optical axes.

In a particular arrangement, the drive rings have portions about which the longitudinal ends of the connecting member are wrapped. These portions of the drive rings are larger in the optical axes direction than the connecting member so that the position of the drive rings along the optical axes can be finely adjusted independently without dislodging the connecting member.

It is yet still another object of the present invention to provide a binocular in which the position of the driving members in relation to lens frames holding magnifying-power-varying lenses can be adjusted after assembly.

According to yet still another aspect of the present invention, the binocular includes:
two telescope systems having parallel optical axes, each telescope system further including a lens group designated as a magnifying-power-varying lens group and further including a barrel for supporting the magnifying-power-varying lens group; and
a magnifying-power-varying mechanism for moving the magnifying-power-varying lens groups.

The magnifying-power-varying mechanism includes drive members and a connecting member.

The drive members include guide rings for guiding the magnifying-power-varying lens groups along the optical axes and cam rings rotatably provided for actuating the magnifying-power-varying lens groups. In particular, the magnifying-power-varying mechanism is arranged such that the positions of the guide rings with respect to the telescope systems can be adjusted.

For adjustment, the guide rings have operation members and the barrels have openings to allow access to the operation members from the exterior of the binocular. In a particular arrangement, the opening is covered by an eye cup to prevent the operation members from being moved accidentally.

In order to facilitate the movement of the magnifying-power-varying lens groups, the guide rings have linear guide grooves extending along the optical axes and the cam rings have cam grooves.

In this aspect, the guide rings, and thus, the position of the magnifying-power-varying lens groups can be independently adjusted, even after assembly.

It is a further object of the present invention to provide a binocular in which the breaking of lens frames can be prevented if an excessive force is applied.

According to a further aspect of the present invention, the binocular includes:

two telescope systems having parallel optical axes, each of the telescope systems including a lens group designated as a magnifying-power-varying lens group and a lens frame for holding the magnifying-power-varying lens group; and a magnifying-power-varying mechanism for moving the magnifying-power-varying lens groups.

The magnifying-power-varying mechanism includes drive members and a connecting member.

The drive members include guide rings for guiding the magnifying-power-varying lens groups along the optical axes, and cam rings rotatably provided for moving the magnifying-power-varying lens groups.

In particular, the lens frames include sliders, for engaging linear guide grooves provided on the guide rings, and cam pins, for engaging cam grooves on the cam rings. Preferably, the cam pins are fixable to the sliders. Also preferably, the cam rings are on the outside of the guide rings.

In a particular arrangement, the linear guide grooves are internal grooves formed on the inner surfaces of the guide rings, and at least one guide groove of each guide ring has a hole through which the cam pin projects to engage the cam groove.

In this aspect, since the cam pins are fixed to the sliders (not directly to the circumference of the lens frames), and the sliders are in guide grooves, any excessive force that is applied to the cam pins will be partially absorbed by the sliders preventing the lens frame from breaking.

It is a still further object of the present invention to provide a binocular in which the difference in visual fields observed through the left and right telescope systems can be compensated.

According to a still further aspect of the present invention, the binocular includes:

two telescope systems having parallel optical axes, each of the telescope systems including a lens group designated as a magnifying-power-varying lens group and a lens frame for holding the magnifying-power-varying lens group; and a magnifying-power-varying mechanism for moving the magnifying-power-varying lens groups.

The magnifying-power-varying mechanism includes drive members and a connecting member.

The drive members include guide rings for guiding the magnifying-power-varying lens groups along the optical axes in linear guide grooves.

In particular, each of the lens frames has at least one slider which can engage at least one of the linear guide grooves, and each of the guide rings has a plurality of guide grooves such that the lens frames can be mounted in the guide rings in a plurality of positions by rotating the lens frames about the optical axes.

Preferably, the linear guide grooves are provided at regular intervals, for example, 90 degree intervals, around the circumference of the guide rings and the sliders are provided at regular intervals.

In a particular arrangement, cam rings having cam grooves are provided to the periphery of the guide rings, cam pins are provided on the sliders, and at least one hole is formed on at least one guide groove of each guide ring. The cam pin projects through the hole to engage the cam groove.

In this arrangement, the cam pin can be provided to any slider of the lens frame, and the lens frames can be mounted to the guide rings in a plurality of positions by rotating around the optical axis, so that any mounting error of the lens in the lens frame can be compensated for.

It is yet still further object of the present invention to provide a binocular having lens frames that do not interfere with a user's spectacle lenses.

According to a further development of any of the aspects above, the binocular includes an eyepiece frame for holding a rearmost lens of the eyepiece optical system. The eyepiece frame is such that an end surface of the eyepiece frame that is facing the user is concave with a predetermined curvature. This predetermined curvature will prevent the eyepiece frame from interfering with a user's spectacles.

In a particular arrangement, the eyepiece frame has a threaded portion which can be engaged to a barrel of a telescope system of the binocular. With this construction, the eyepiece frame is easily assembled to the binocular and can be easily removed for use with other binoculars or optical devices.

The threading on the eyepiece frame also allows the eyepiece frame to secure the axial position of a lens group of objective side of the eyepiece optical system.

It is an other object of the present invention to provide a binocular that has a stable locking mechanism for eye cups.

According to an other development of any of the aspects above, the binocular includes a locking mechanism for locking an eye cup to a barrel of the binocular.

In this locking mechanism, at least three indentations are formed on one of an outer surface of the barrel and an inner surface of the eye cup, and two protrusions are formed on the other of the outer surface of the barrel and the inner surface of the eye cup. In this way, the eye cup can be secured in a predetermined position by the engagement of the two protrusions and two of the three indentations.

Preferably, the indentations are formed in a groove having the same width as the indentations, the groove regulating the position, in the circumferential direction, of the eye cup. Also preferably, the binocular further includes a flange portion that is provided to an eyepiece frame to act as a stopper for the eye cup.

BRIEF DESCRIPTION OF THE DRAWINGS

FIGS. 10A and 10B shows two views of a belt;

FIG. 20 shows a perspective view of an eye cup;

DETAILED DESCRIPTION OF THE PREFERRED EMBODIMENTS

Figure 1:
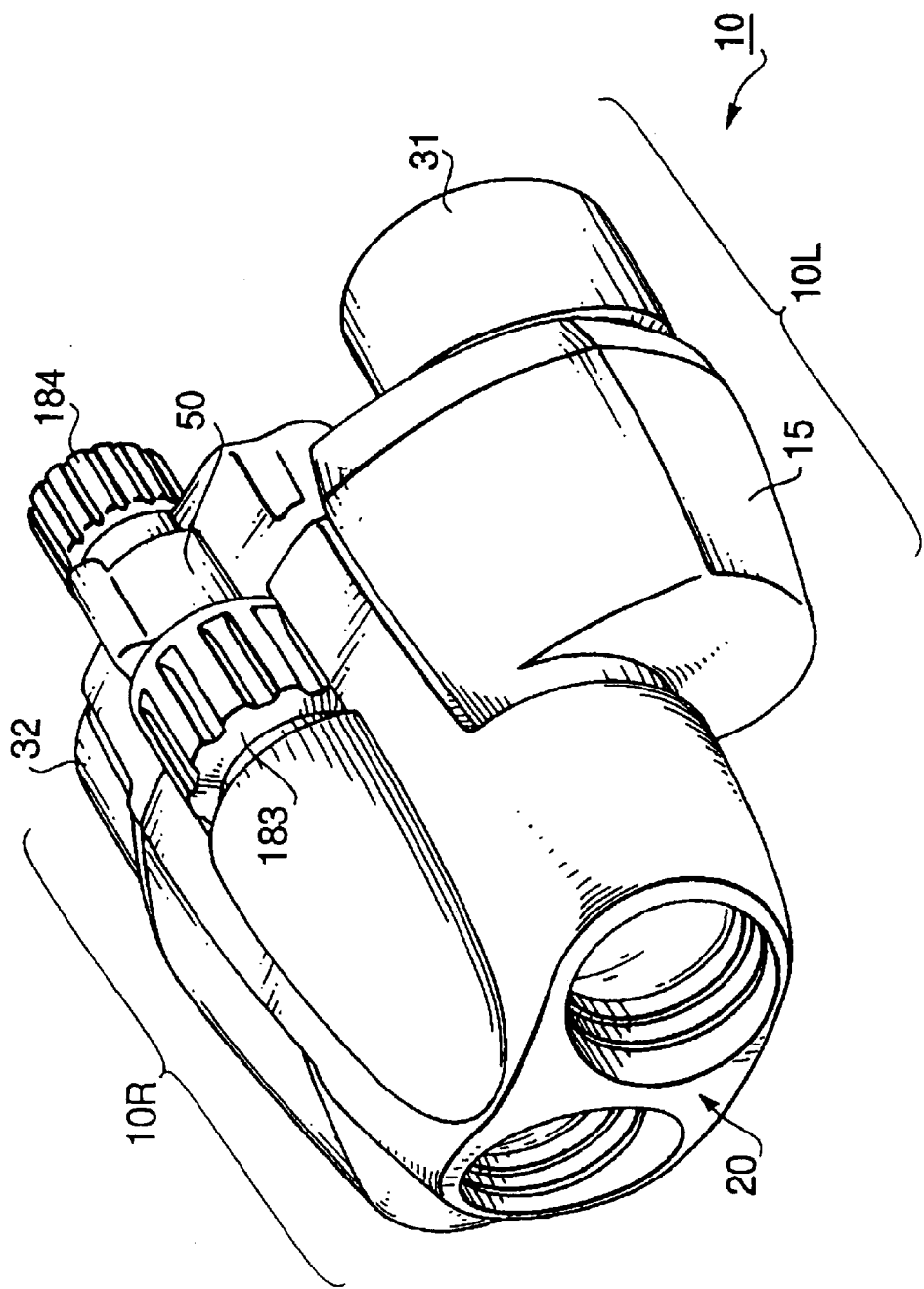
FIG. 1 shows a perspective view of a binocular according to the invention.

FIG. 1 is a perspective view of a binocular 10 according to the invention. The binocular 10 includes parallel right and left telescope systems 10L, 10R and a front frame 20.

In general, the telescope systems 10L, 10R in the embodiment are symmetrical with each other. As such, wherever possible, the description will deal with the left telescope system 10L and the corresponding reference numbers for the right telescope system 10R will be shown in brackets. Further, the term "lens" or "lenses" is used but there are many alternative arrangements wherein these terms could be replaced by "lens group" or "lens groups" respectively.

Figure 2:
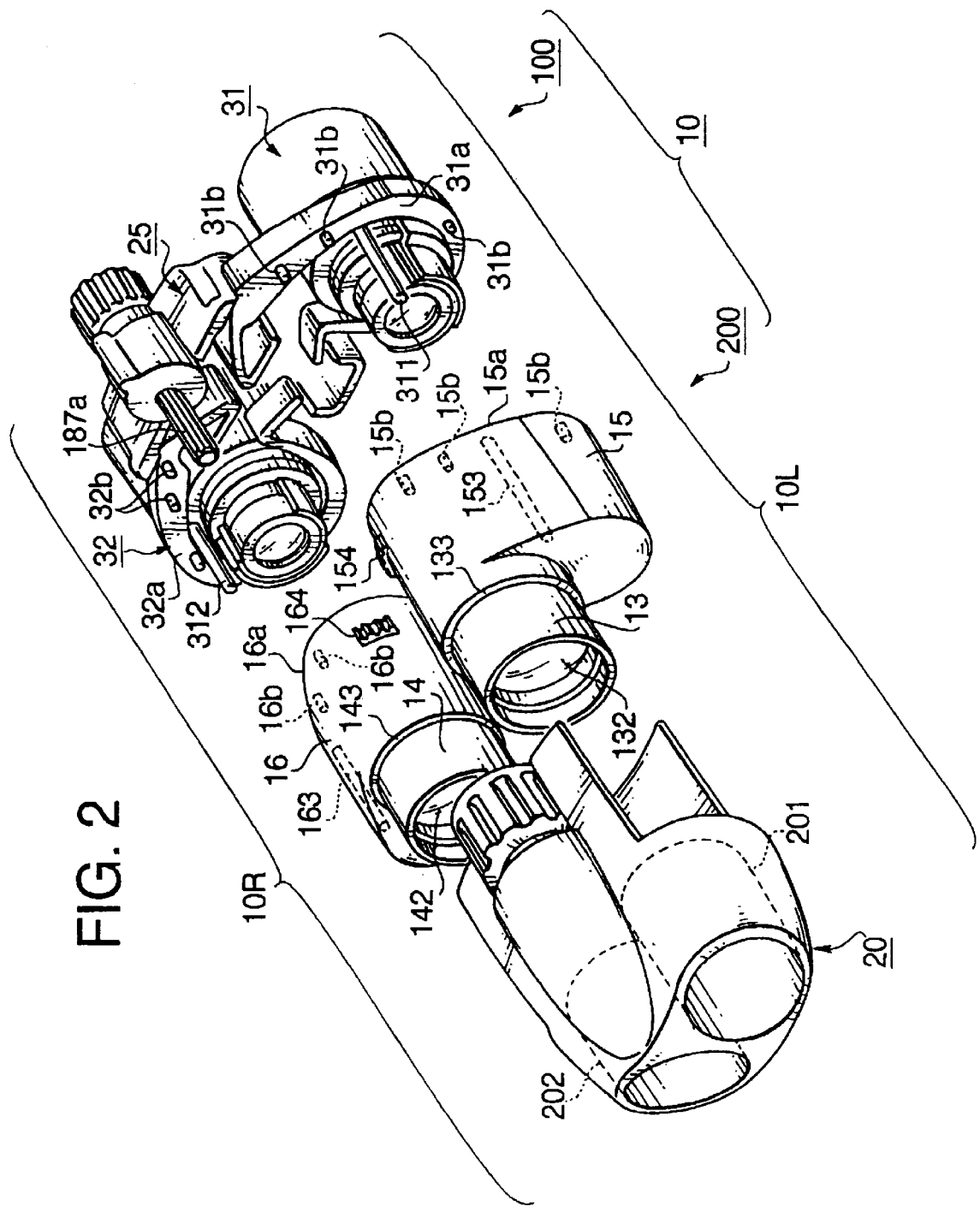
FIG. 2 shows a perspective exploded view of the binocular.

FIG. 2 is a perspective exploded view of the binocular 10 shown in FIG. 1.

As shown in FIG. 2, the telescope system 10L (10R) includes a front barrel 13 (14), an intermediate barrel 15 (16) and a rear barrel 31 (32).

The front barrel 13 (14) fits into a bore 201 (202) formed in the front frame 20, and is rotatably supported therein.

The intermediate barrel 15 (16) houses an erecting system (described later) and is fixed to the rear of the front barrel 13 (14).

The rear barrel 31 (32) is provided at the rear side of the intermediate barrel 15 (16). The rear barrel 31 (32) is on a different optical axis (eyepiece optical axis) from the optical axis of the front barrel 13 (14) (object optical axis). The intermediate barrel 15 (16) is on both the eyepiece optical axis and the object optical axis. Parts of the binocular 10 that are on the eyepiece optical axis comprise a rear portion of the binocular 10 and parts of the binocular 10 that are on the object optical axis comprise a front portion of the binocular 10. A support frame 25 swingably supports the rear barrels 31 and 32. The interpupillary distance of the binocular 10 can be adjusted by swinging the rear barrels 31 and 32.

As shown in FIG. 2, the front frame 20, the front barrels 13 and 14, and the intermediate barrels 15 and 16 comprise a front unit 200. The rear barrels 31 and 32 and the support frame 25 comprise a rear unit 100. The binocular 10 is assembled by attaching the rear unit 100 with the front unit 200.

In order to allow easy assembly, the front barrel 13 (14) is formed with a shoulder 133 (143) which abuts an inner shoulder provided in the bore 201 (202) to determine the position along the object optical axis of the front barrel 13 (14) in the front frame 20.

The rear barrel 31 (32) has a reference surface 31a (32a) that abuts a rear end surface 15a (16a) of the intermediate frame 15 (16) to determine the position along the eyepiece optical axes of the rear barrel 31 (32) with respect to the intermediate barrel 15 (16).

Positioning pins 31b (32b) are provided on the reference surface 31a (32a), which fit to holes 15b (16b) formed on the rear end surface 15a (16a) of the intermediate frame 15 (16) to determine the orientation of the rear barrel 31 (32) with respect to the intermediate barrel 15 (16) in a plane perpendicular to the eyepiece optical axis.

Further, a guide bar 311 (312) is formed on the rear barrel 31 (32) extending toward the front frame 20. On coupling the rear unit 100 to the front unit 200, the guide bars 311 and 312 respectively fit into guide holes 153 and 163 formed on the rear side of the intermediate barrels 15 and 16.

Figure 3:
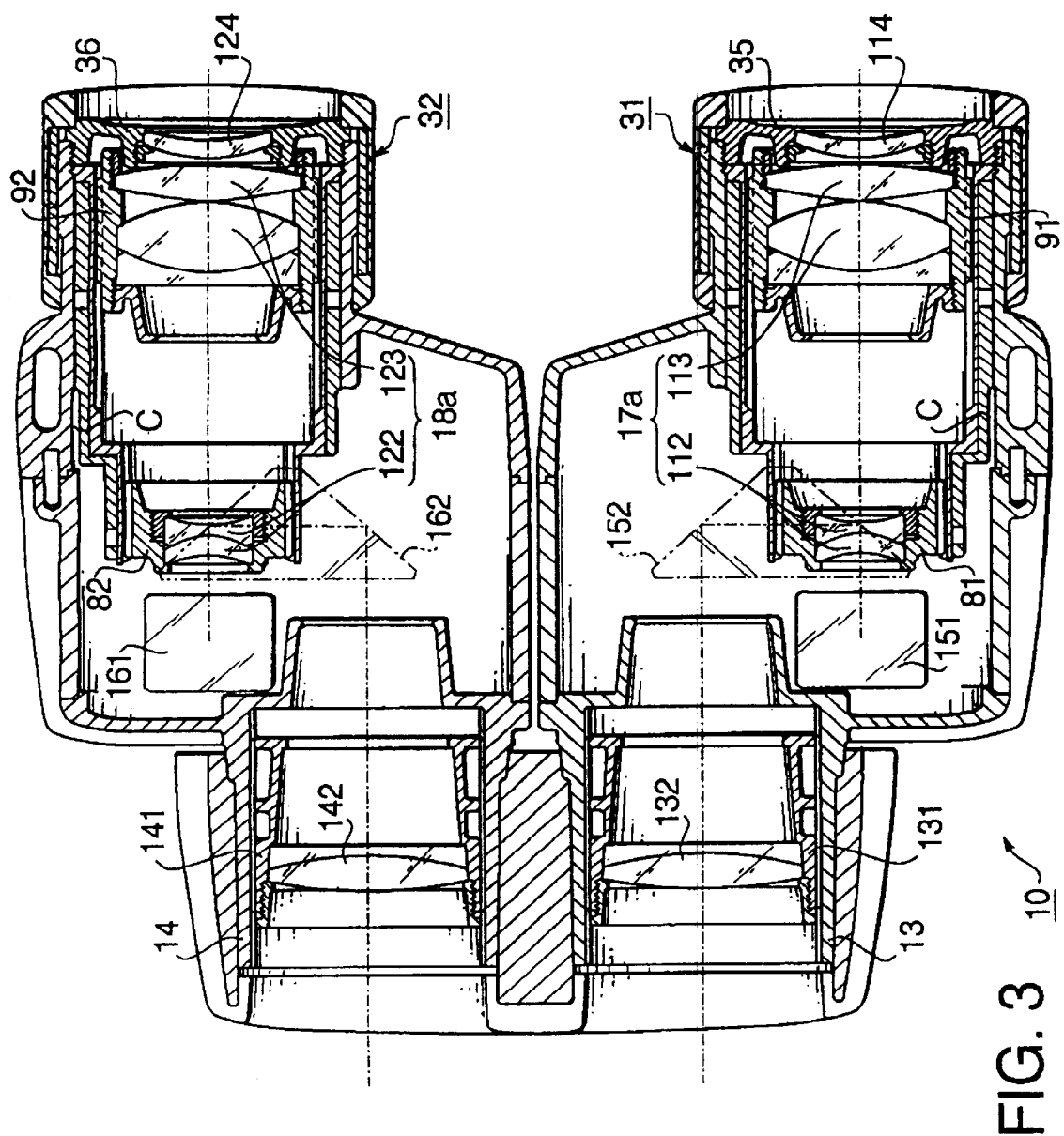
FIG. 3 shows a sectional view of the binocular.

FIG. 3 is a sectional view of the binocular 10. As shown in FIG. 3, the front barrel 13 (14) houses a first lens 132 (142). The first lens 132 (142) is supported by an object frame 131 (141), and the object frame 131 (141) is movable along the object optical axis within the front barrel 13 (14).

Two Porro prisms 151, 152 (161, 162) are provided in the intermediate barrel 15 (16). The Porro prisms 151, 152 (161, 162) constitute an erecting system.

The rear barrel 31 (32) houses a lens group that is designated as a magnifying-power-varying lens group 17a (18a). The magnifying-power-varying lens group 17a (18a) includes a first magnifying-power-varying lens 112 (122) and a second magnifying-power-varying lens 113 (123). The first and second magnifying-power-varying lenses 112, 113 (122, 123) are respectively held by the first and second lens frames 81, 91 (82, 92), and both first and second lens frames 81, 91 (82, 92) are supported by the rear barrel 31 (32) and are movable along the eyepiece optical axis.

An eyepiece frame 35 (36) is fixed at the rear end of the rear barrel 31 (32) and supports a second lens 114 (124).

The first lens 132 (142) and the first magnifying-power-varying lens 112 (122) constitute an object optical system and the second magnifying-power-varying lens 113 (123) and the second lens 114 (124) constitute an eyepiece optical system. A field stop 17b (18b) is provided to the second lens frame 91 (92) at the position where an image is formed by the object optical system.

Figure 4:
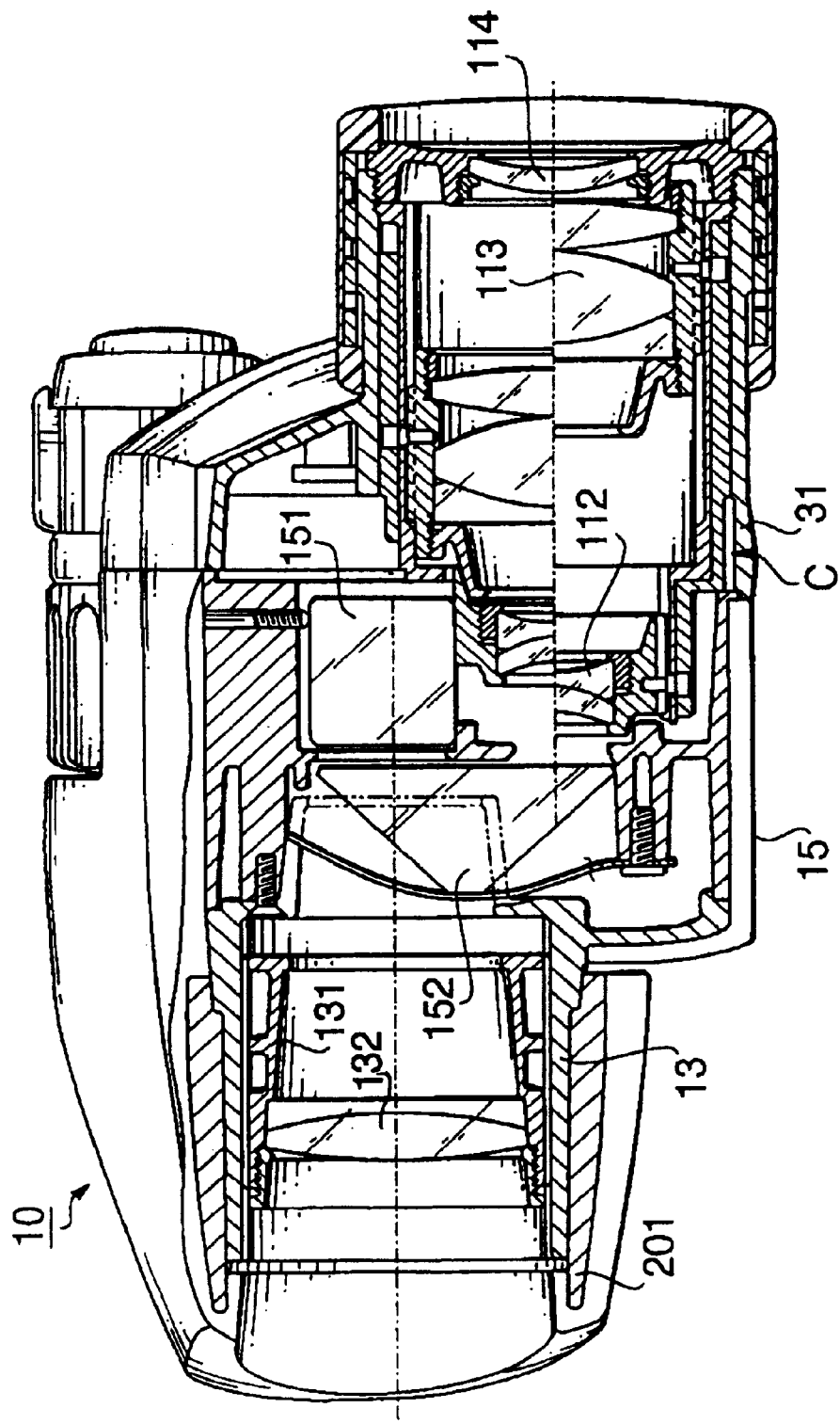
FIG. 4 shows a cross-section of the binocular.

FIG. 4 is a cross section of the telescope system 10L (10R) showing the positions of the first and second magnifying-power-varying lenses 112, 113 (122, 123) at maximum magnification (tele) and minimum magnification (wide). The positions of the first and second magnifying-power-varying lenses 112, 113 (122, 123) at the tele position are shown above the dotted line and at the wide position are shown below the eyepiece optical axis center line.

Figure 5:
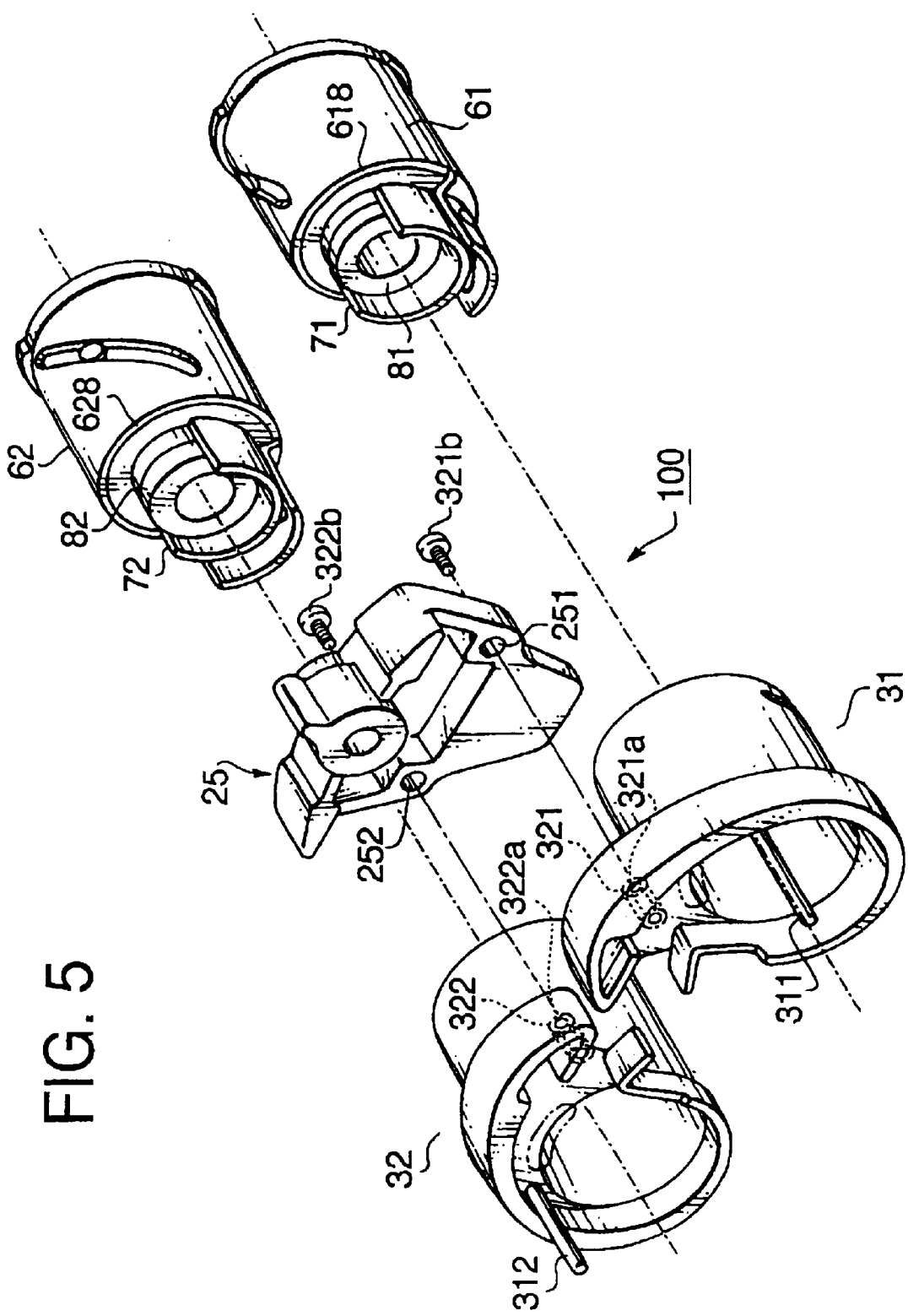
FIG. 5 shows a perspective exploded view of a rear unit.

FIG. 5 is a perspective exploded view of the rear unit 100. The rear barrel 31 (32) has a rotation shaft 321 (322) for connection to the support frame 25. The rotation shaft 321 (322) is coaxial with the object optical axis. The rotation shaft 321 (322) is inserted through a through-hole 251 (252) provided in the support frame 25. The rotation shaft 321 (322) has an internal thread 321a (322a) at its rear portion to which a bolt 321b (322b) is screwed.

The length of the rotation shaft 321 (322) is such that the rear barrel 31 (32) is loosely supported in the axial direction by the support frame 25. Therefore, when coupling the rear unit 100 to the front unit 200 (FIG. 2), even if there is a difference in the axial positions of the left and right front barrels 13 and 14 (FIG. 2), the positions along the optical axes of the rear barrels 31 and 32 are adjustable so that they can be aligned with respect to the intermediate barrels 15 and 16, and therefore, with respect to the front barrels 13 and 14 (FIG. 2). This allows adjustment of the rear barrels 31 and 32 to ensure that the distance between the left first lens 132 and the left magnifying-power-varying lens group 17a (FIG. 3) is the same as the distance between the right first lens 142 and the right magnifying-power-varying lens group 18a (FIG. 3).

The rear unit 100 and the front unit 200 are first assembled and then the binocular 10 is assembled by coupling the rear unit 100 to the front unit 200 as shown in FIG. 2. As such, the assembly is modular and simple.

The rear barrel 31 also houses a driving member, for example, including a cam ring 61 (62) and a guide ring 71 (72), for moving the magnifying-power-varying lens group 17a (18a) (FIG. 3).

The guide ring 71 (72) is provided inside the cam ring 61 (62), for linearly guiding the magnifying-power-varying lens group 17a (18a) (FIG. 3).

Figure 6:
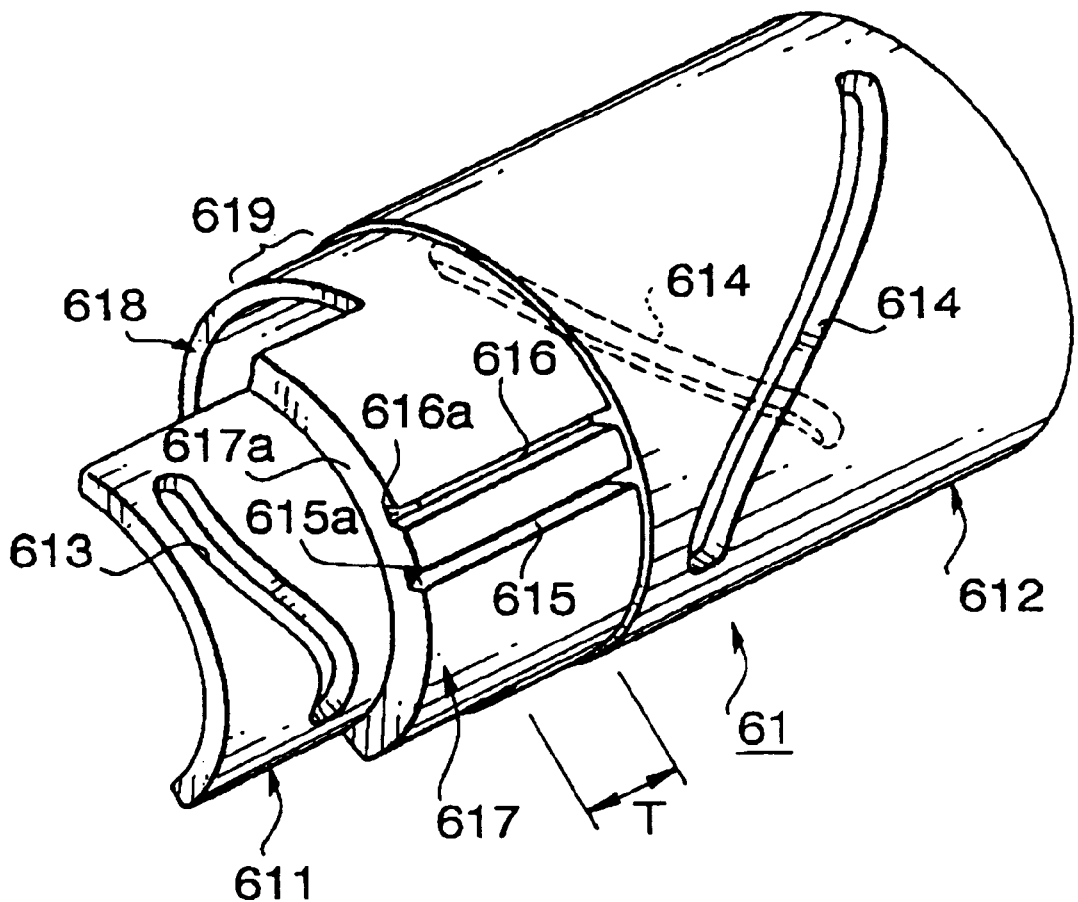
FIG. 6 shows a perspective view of a cam ring.

FIG. 6 is a perspective view of the cam ring 61 (62). As shown in FIG. 6, the cam ring 61 (62) includes a cylinder portion 612 (622), an arc wall 617 (627) extending from one end of the cylinder portion 612 (622), and an extended arc wall 611 (621) extending from the end opposite the cylinder portion of the arc wall 617 (627). The arc wall 617 (627) and the extended arc wall 611 (621) form an arc along the end of the cam ring 61 (62) and a remaining surface of the end of the cylinder portion 612 (622) defines a reference surface 618 (628). The outer radius of the extended arc wall 611 (621) is less than the outer radius of the arc wall 617 (627) creating a shoulder surface 617a (627a). A first cam groove 613 (623) is formed on the extended arc wall 611 (621) which allows a predetermined amount of movement of the first magnifying-power-varying lens 112 (122). The arc formed by the arc wall 617 (627) and the extended arc wall 611 (621) around the end of the cylinder portion 612 (622) is sufficient to accommodate the first cam groove 613 (623).

A predetermined length of the cylinder portion 612 (622), measured from the reference surface 618 (628), is a mounting portion 619 (629) for a connecting member (described below). The mounting portion 619 (629) has a smaller diameter than the remainder of the cylinder portion 612 (622), providing a clearance C (FIG. 3) between the mounting portion 619 (629) and the inner surface of the rear barrel 31 (32) (FIG. 3). Two parallel slots 615, 616 (625, 626) are axially formed at a predetermined location on the mounting portion 619 (629) and extend along the arc wall 617 (627), for attaching the connecting member (described below).

Second cam grooves 614 (624) are formed on opposite sides of the cylinder portion 612 (622) to drive the second magnification power varying lens 122 (123).

Figure 7A:
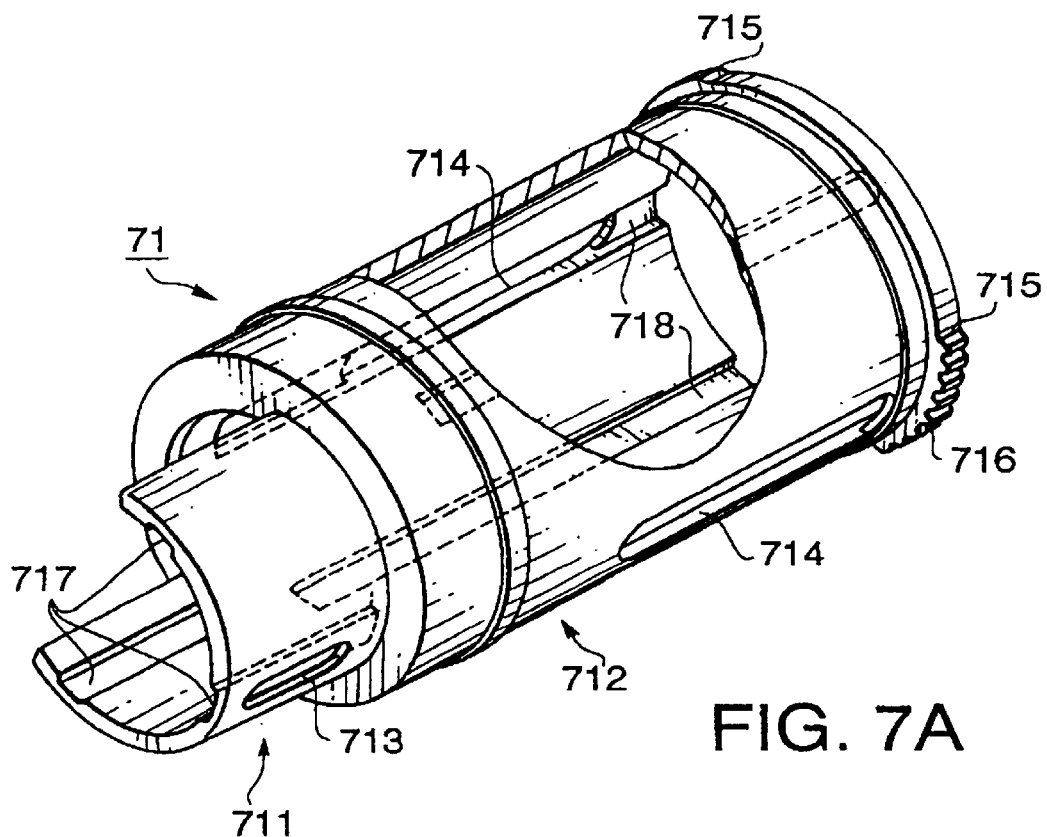
FIGS. 7A and 7B show two views of a guide ring.
Figure 7B:
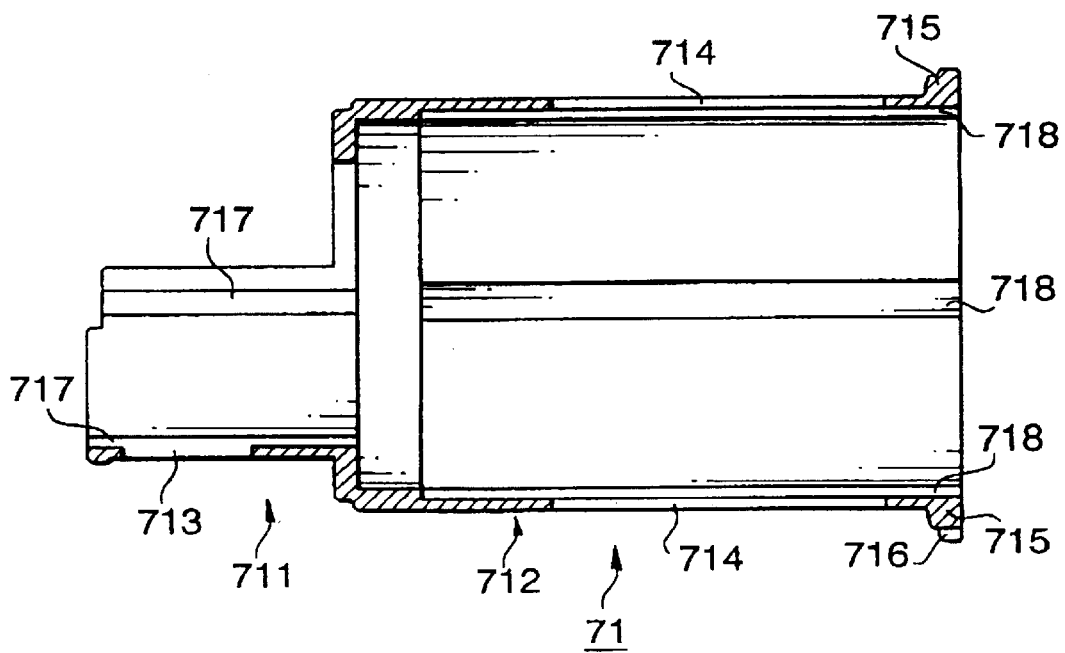

FIG. 7A and FIG. 7B are respectively, a perspective view and a cross section of the guide ring 71 (72).

The guide ring 71 (72) includes a large cylinder portion 712 (722) and a small arc wall 711 (721) that extends coaxially from an end of the large cylinder portion 712 (722). A flange portion 715 (725) is formed on the exterior of the remaining end of the large cylinder portion 712 (722). The flange portion 715 (725) includes sector gears 716 (726) in a predetermined position to be used to adjust the position of the guide ring 71 (72) as described below.

Three linear guide grooves 717 (727) are axially formed on the inner surface of the small arc wall 711 (721) at intervals of 90 degrees. An elongated hole 713 (723) is axially formed in one of the linear guide grooves 717 (727) extending almost the entire length of the groove 717 (727) and being sufficiently long to match the cam groove 613 (623) of the cam ring 61 (62). The arc wall 711 (721) is formed such that it forms an arc around the end of the cylinder portion 712 (722) sufficient to provide three linear guide grooves 717 (727).

Four guide groves 718 (728) are axially formed on the inner surface of the large cylinder portion 712 (722) at intervals of 90 degrees. Two elongated holes 714 (724) are axially formed in two opposing guide grooves 718 (728). The two elongated holes 714 (724) are formed to match the second cam grooves 614 (624) on the cam ring 61 (62).

Figure 8:
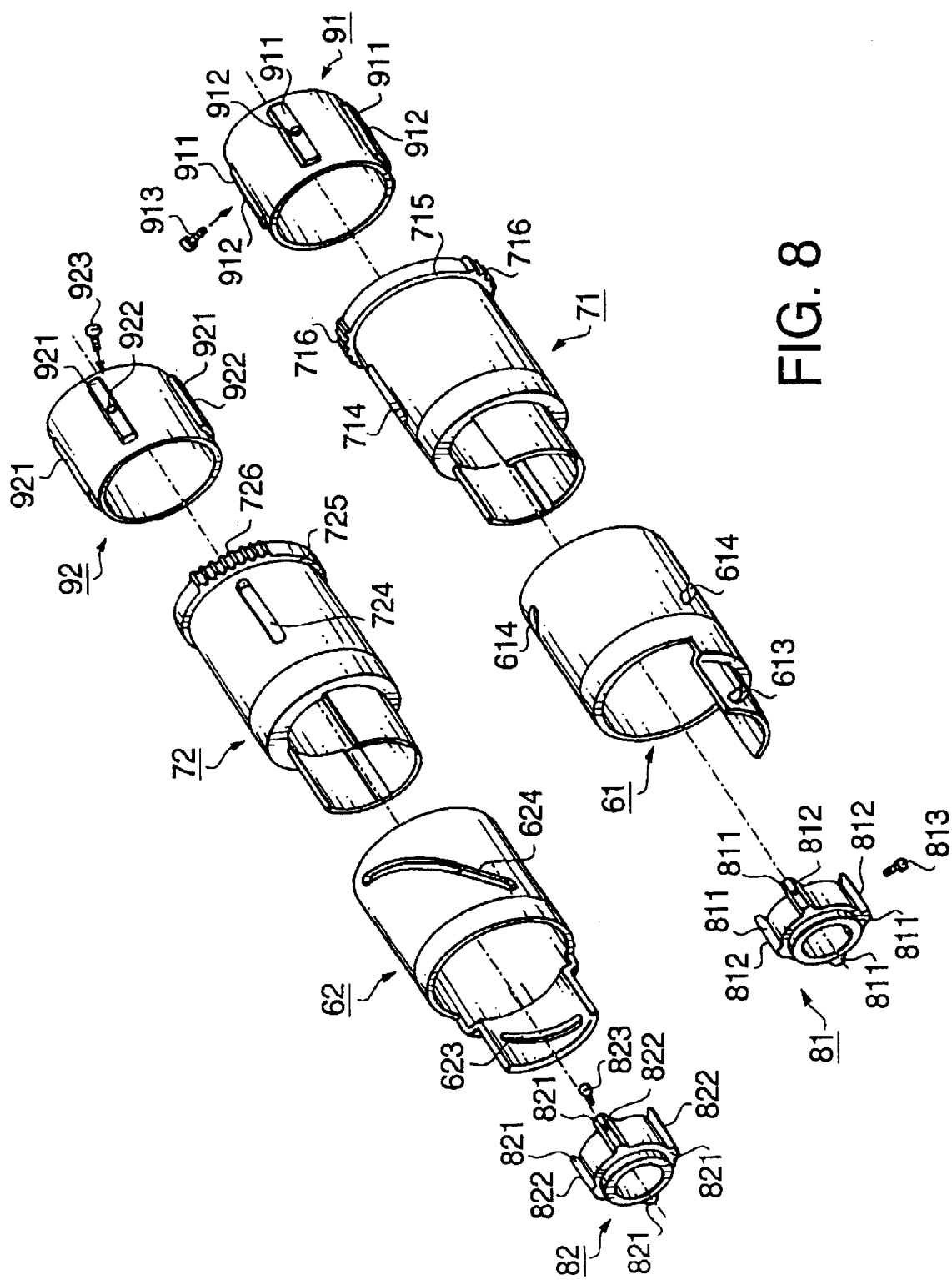
FIG. 8 shows an exploded perspective view of the cam rings, the guide rings, first lens frames, and second lens frames.

FIG. 8 is an exploded perspective view of the cam rings 61 and 62, the guide rings 71 and 72, the first lens frames 81 and 82, and the second lens frames 91 and 92.

The first lens frame 81 (82) has four sliders 811 (821) at intervals of 90 degrees on the circumference thereof. A screw hole 812 (822) is provided at the longitudinal center of each slider 811 (821). A cam pin 813 (823) is screwed into one of the four screw holes 812 (822), selected as described below.

The first lens frame 81 (82) is supported by the guide ring 71 (72) and the cam ring 61 (62) such that the sliders 811 (821) slidably engage the linear guide grooves 717 (727) (FIG. 7A) of the guide ring 71 (72) and that the cam pin 813 (832) extends through the elongated hole 713 (723) (FIG. 7A) of the guide ring 71 (72) and engages the cam groove 614 (614) of the cam ring 61 (62).

The second lens frame 91 (92) has four sliders 911 (921) formed at intervals of 90 degrees on the outer circumference thereof. A screw hole 912 (922) is provided at the longitudinal center of each slider 911 (921). Two cam pins 913 (923) are screwed into two of the four screw holes 912 (922) of the sliders 911 (921), selected as described below.

The second lens frame 91 (92) is supported by the guide ring 71 (72) and the cam ring 61 (62) such that the sliders 911 (921) slidably engage the linear guide grooves 718 (728) (FIG. 7A) of the guide ring 71 (72) and that the cam pins 913 (923) extend through the elongated holes 714 (724) (FIG. 7A) of the guide ring 71 (72) and engage the cam grooves 614 (624) of the cam ring 61 (62).

Thus, the cam pin 813 (823) contacts the cam groove 613 (623) and the sliders 811 (821) contact the linear guide grooves 717 (727) to control the movement of the first lens frame 81 (82) and, at the same time, the cam pin 913 (923) contacts the cam groove 614 (624) and the sliders 911 (921) contact the linear guide grooves 718 (728) to control the movement of the second lens frame 91 (92).

Since the linear guide grooves 717 (727) and the sliders 811 (821) are provided at the same intervals, and each slider 811 (821) has a screw hole 812 (822), the cam pin 813 (823) can be fixed to any of the sliders 811 (821) and that slider 811 (823) is then engaged to the guide groove 717 (727) (FIG. 7A) having the elongated hole 713 (723). That is, the orientation of the first lens frame 81 (82) about the eyepiece optical axis can be selected. Similarly, the orientation of the second lens frame 91 (92) about the eyepiece optical axis can be selected.

The ability to select from a number of orientations about the eyepiece optical axis is important because, in general, a lens is minutely inclined with respect to its lens frame. In the present embodiment, any inclination of the first magnifyingpower-varying lens 112 (122) and the second magnifying-power-varying lens 113 (123) can be compensated for by changing the orientation of the first lens frame 81 (82) and the second lens frame 91 (92).

In other words, as constructed above, if there are any differences between the visual field seen through the left and right telescope systems 10L and 10R (FIG. 2) because of this minute mounting error or the like, the visual field can be adjusted by changing the orientation of the first lens frame 81 (82) or the second lens frame 91 (92).

Figure 9A:
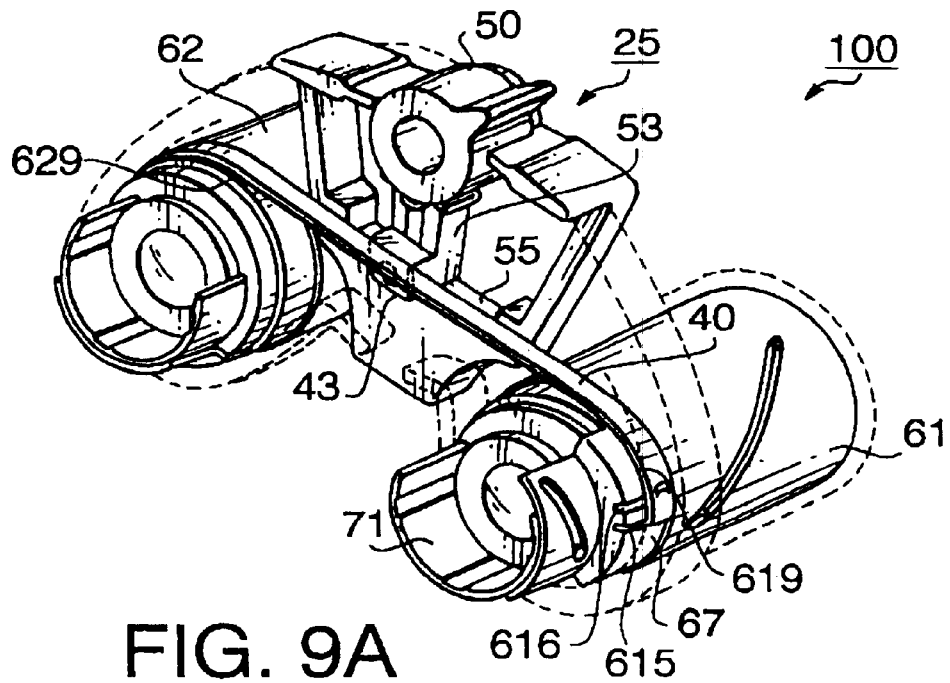
FIGS. 9A and 9B show two perspective views of the rear unit.
Figure 9B:
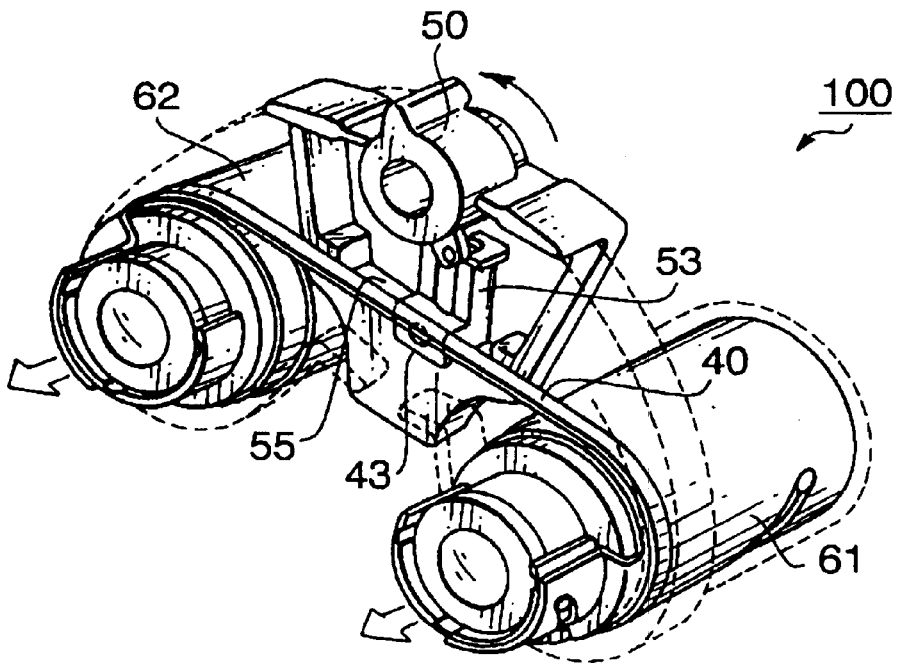

FIGS. 9A and FIG. 9B are perspective views of the rear unit 100, showing the operation of a magnifying-power-varying mechanism. The magnifying-power-varying mechanism includes the support frame 25, a connecting member, such as a belt 40, a magnifying-power-varying knob 50, a connector 53, the cam rings 61 and 62, and the guide rings 71 and 72.

The belt 40 is made of a material, such as metal, which is sufficiently rigid to transmit a rotational force to the cam rings 61, 62 and sufficiently flexible to be bent around the cam rings 61, 62 (FIG. 9). In the embodiment, the belt 40 is made of Ni—Cr—Mo alloy, for example, Hastelloy C-22 (trade mark) manufactured by Mitsubishi Material Kabushiki Kaisha.

FIGS. 10A and FIG. 10B are respectively a front view of the belt 40 and an enlarged view of the ends of the belt 40. As shown in FIG. 10A, a predetermined length from each end of the belt 40 is bent with a curvature of radius R1, so that the curved portions 40*a* can be wound around the mounting portions 619 and 629 of the cam rings 61 and 62 (FIG. 9A).

As shown in FIG. 10B, a small piece at each end of the belt is bent inwardly to form bent portions 41*a* and 41*b*. Tongue portions 42*a* and 42*b* are also provided at a predetermined distance from the bent portions 41*a* and 41*b*. The tongue portions 42*a* and 42*b* are formed by cutting the belt 40 and folding inwardly so that the tongue portions 42*a* and 42*b* are parallel to the bent portions 41*a* and 41*b*.

As shown in FIG. 10A, a connecting portion 43 is provided at the center of the belt 40, for connecting the belt 40 to a connector 53 (FIG. 9) which is then connected to the magnifying-power-varying operation knob 50 (FIG. 9).

As shown in FIG. 9A, the belt 40 connects the left and right cam rings 61, 62, in order to synchronize the movement of the cam rings 61, 62. The belt 40 is bent around the mounting portion 619 (629) (FIG. 6) of the cam ring 61 (62).

Figure 11:
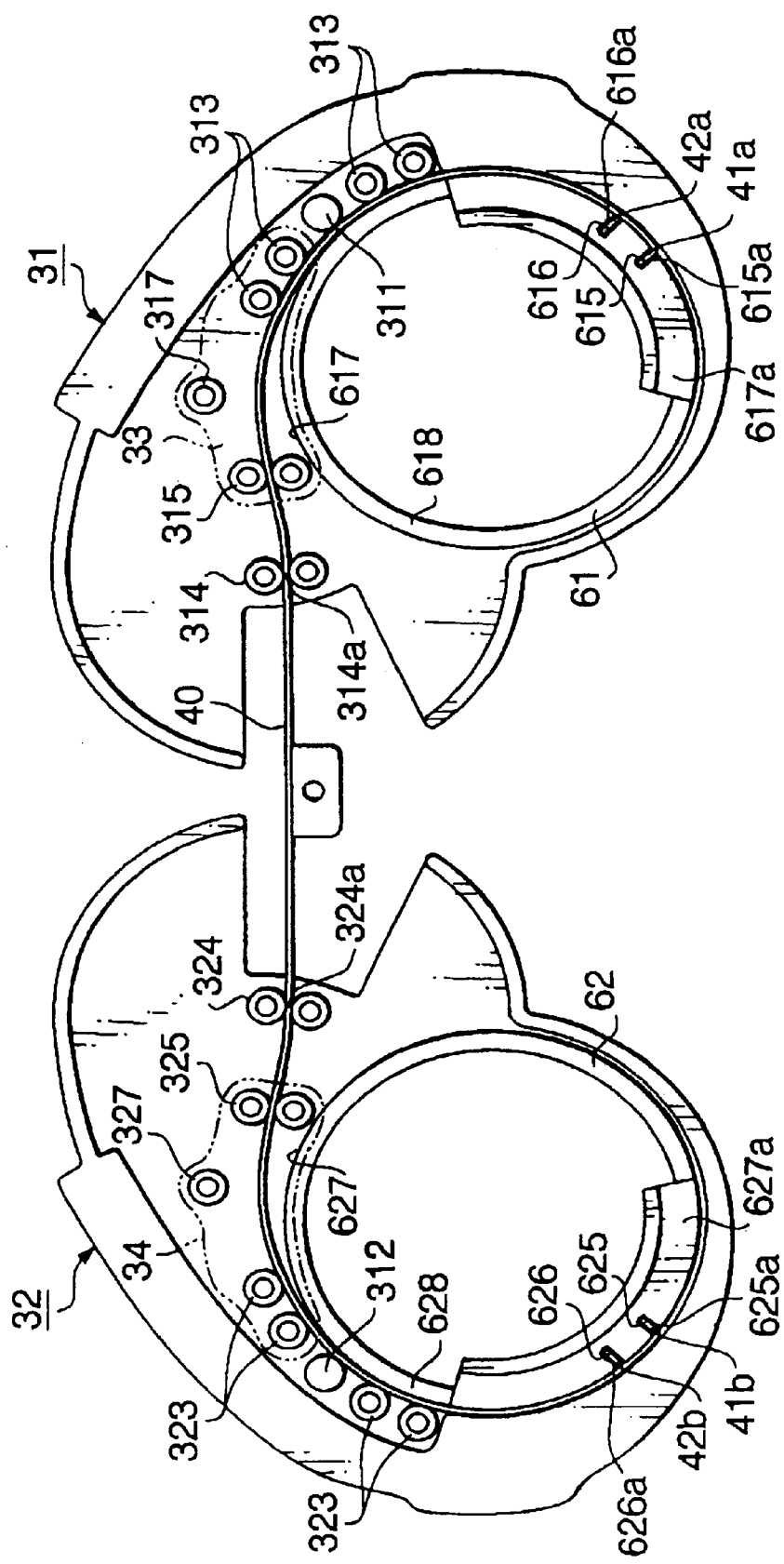
FIG. 11 shows a front view of the belt and rear barrels.

FIG. 11 is a front view of the belt 40 as installed in the rear barrels 31 and 32. The support frame 25 and the guide rings 71 and 72 are omitted in FIG. 11. The bent portion 41*a* and the tongue portion 42*a* of the belt 40 are engaged with the slots 615 and 616 of the left cam ring 61. The bent portion 41*b* and the tongue portion 42*b* are engaged with the slots 625 and 626 of the right cam ring 62.

The curved portions 40*a* of the belt 40 wrap around the mounting portions 619 and 629 and are designed to fit in clearance C (FIG. 3) between the outer surfaces of the mounting portions 619 and 629 and the inner surfaces of the rear barrels 31 and 32.

The rear barrel 31 (32) includes rollers 313 (323) along the path of the belt 40, for guiding the belt 40. Also, support roller pair 314 (324) is provided to the rear barrel 31 (32), for holding the belt 40 therebetween, and is positioned so that a center 314*a* (324*a*) of support roller pair 314 (324) is coaxial with the rotation shaft 321 (322) (FIG. 5). Adjacent to the support roller pair 314 (324), a holding roller pair 315 (325) is provided for holding the belt 40.

Figure 12:
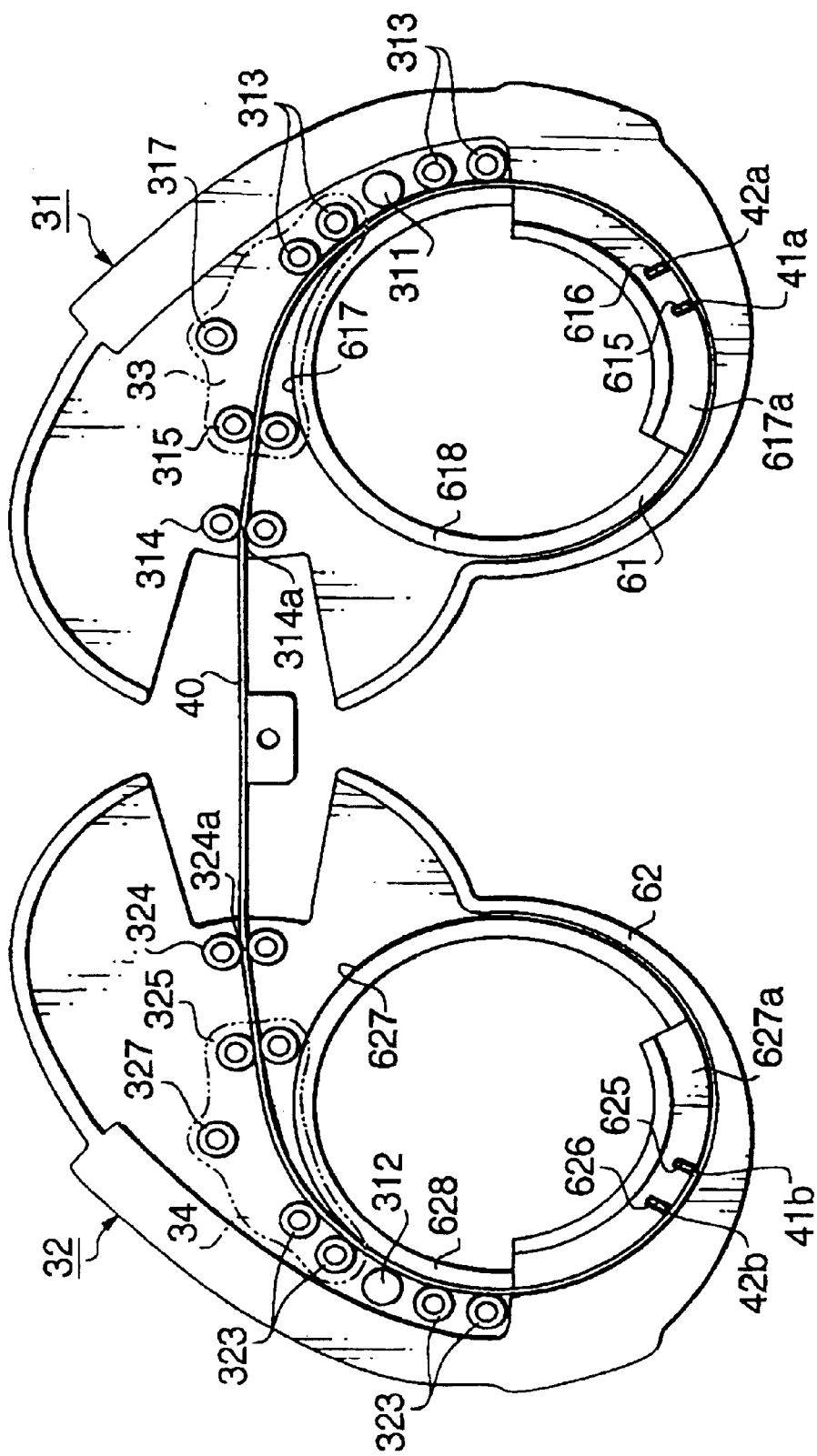
FIG. 12 shows a front view of the belt and rear barrels in a different position from that in FIG. 11.

FIG. 12 is a front view of the belt 40, showing the status when the rear barrels 31 and 32 are rotated from the position in FIG. 11 to adjust the interpupillary distance. In this case, the belt 40 is supported by the support roller pair 314 (324) at the rotation axis so that the distance between the bent portion 41*a* (41*b*) and the center 314*a* (324*a*) of the support roller pair 314 (324) remains the same. That is, the belt 40 is not moved longitudinally, and as such, the magnifying-power is not affected by the adjustment of the rear barrels 31 and 32.

The gap between the guiding roller pair 314 (324) and the holding roller pair 315 (325) is set to receive any slack in the belt 40 by allowing the belt 40 to bend smoothly in this gap.

As shown in FIG. 10B, the outer surfaces of the bent portions 41*a*, 41*b* are curved, enabling smooth movement of the belt 40 through the clearance C (FIG. 11) without binding.

The bent portion 41*a* (41*b*) and the tongue portion 42*a* (42*b*) of the belt 40 grip the slots 615 (625) and 616 (626) of the cam ring 61 (62) because the distance between the bent portion 41*a* (41*b*) and the tongue portion 42*a* (42*b*) is shorter than the distance between the slots 615 (625) and 616 (626). In this way, the belt 40 is securely fastened to the cam ring 61 (62).

As shown in FIG. 6 and FIG. 11, the slots 615, 616 (625, 626) of the cam ring 61 (62) extend axially and have openings 615*a*, 616*a* (625*a*, 626*a*) at the shoulder portion 617*a* (627*a*), so that the bent portion 41*a* (41*b*) and the tongue portion 42*a* (42*b*) of the belt 40 can be easily inserted into the slots 615, 616 (625, 626). Also, the edges of the slots 615, 616, 625 and 626 at the insertion openings 615*a*, 616*a*, 625*a*, and 626*a* are rounded to allow easy insertion of the belt 40 into the slots 615, 616, 625 and 626.

As shown in FIG. 11, a holding plate 33 (34) is provided in front of the reference surface 618 (628) of the cam ring 61 (62). The holding plate 33 (34) is supported by a pillar 317 (327) provided on the rear barrel 31 (32). As shown in FIG. 5, on assembling the binocular, the cam ring 61 (62) is pushed from the rear side by the eyepiece frame 35 (36) (described later) until the reference surface 618 (628) of the cam ring 61 (62) abuts the holding plate 33 (34) so that the cam ring 61 (62) is axially positioned.

As shown in FIG. 6, the axial length T of each of the mounting portions 619 and 629 (not shown) is longer than the width of the belt 40 by a predetermined amount. Accordingly, even if there is a difference in the axial positions of the right and left rear barrels 31 and 32, the belt 40 remains substantially perpendicular to the rotation axes of the cam rings 61 and 62. Therefore, the belt 40 remains substantially flat and there is little chance of binding of the belt 40 within clearance C.

As shown in FIGS. 9A and 9B, the connector 53 is slidably provided in the support frame 25, for transmitting the rotation of the magnifying-power-varying operation knob 50 to move the belt 40 perpendicular to the eyepiece optical axes. The connector 53 is connected to the connecting portion 43 of the belt 40. The support frame 25 includes a rail 55 for guiding the movement of the connector 53.

Figure 13:
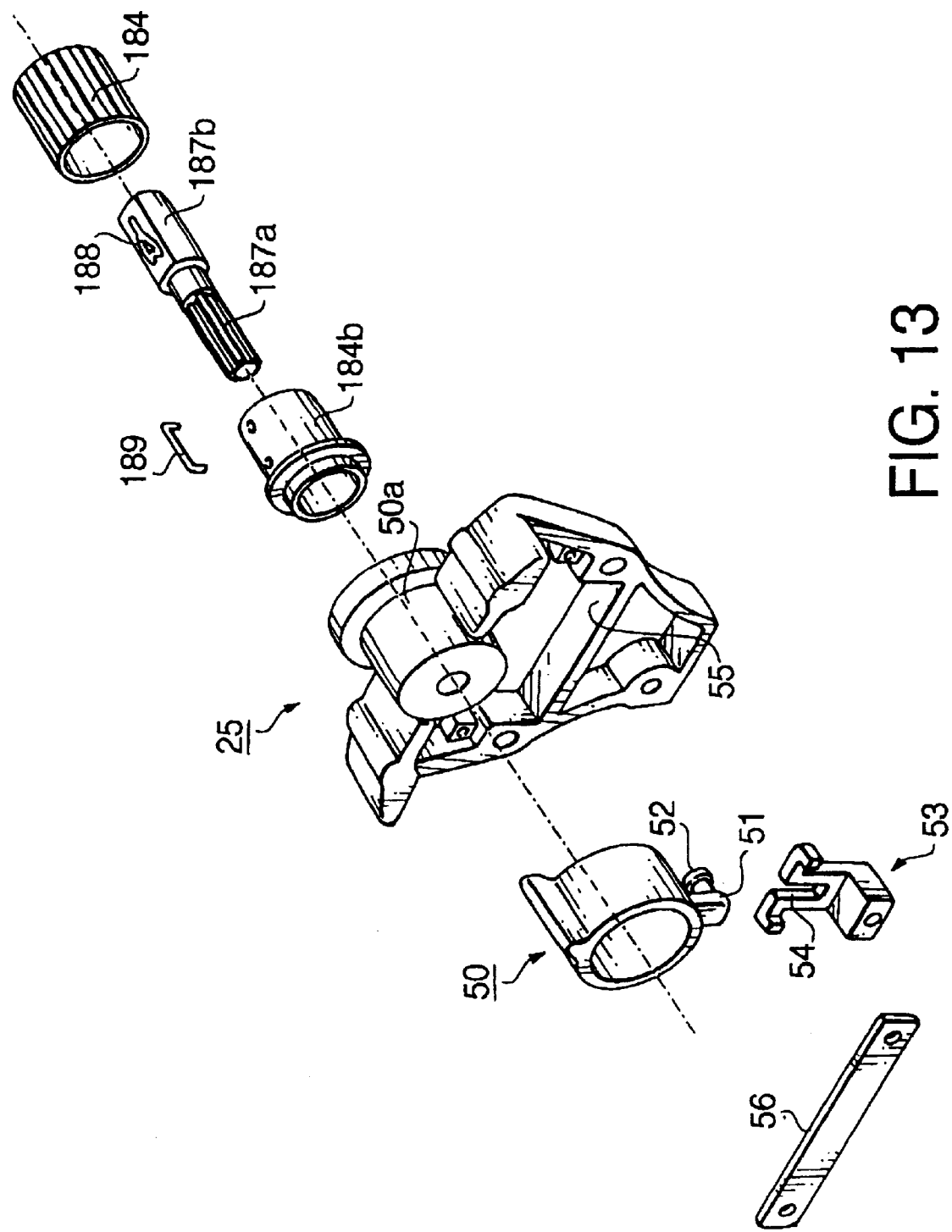
FIG. 13 shows an exploded perspective view of a support frame.

FIG. 13 is an exploded perspective view of the support frame 25. The magnifying-power-varying operation knob 50 is rotatably mounted to a cylindrical portion 50*a* formed on the support frame 25. The magnifying-power-varying operation knob 50 includes an arm 51 extending downward and the arm includes a pin 52. The connector 53 has a groove 54, which engages the pin 52. The support frame 25 further includes a front guide bar 56, which, together with the rail 55, guides the movement of the connector 53.

By rotating the magnifying-power-varying operation knob 50, the belt 40 is moved perpendicular to the eyepiece optical axes by the engagement of the pin 52 and the groove 54, so that the cam rings 61 and 62 (FIG. 9) are rotated.

Thus, as constructed above, the left and right magnifying-power-varying lens groups 17*a* and 18*a* (FIG. 3) are synchronized by a simple mechanism. Further, since the dimension of the belt along the optical axis is small, the binocular can be axially compact.

A focusing adjusting mechanism and a diopter correction mechanism are now described with reference to FIG. 1, FIG. 14, and FIG. 15.

As shown in FIG. 1, a focus adjusting knob 183, the magnifying-power-varying operation knob 50, and a diopter correction knob 184 are coaxially arranged at the center of the optical axes of the binocular 10.

Figure 14:
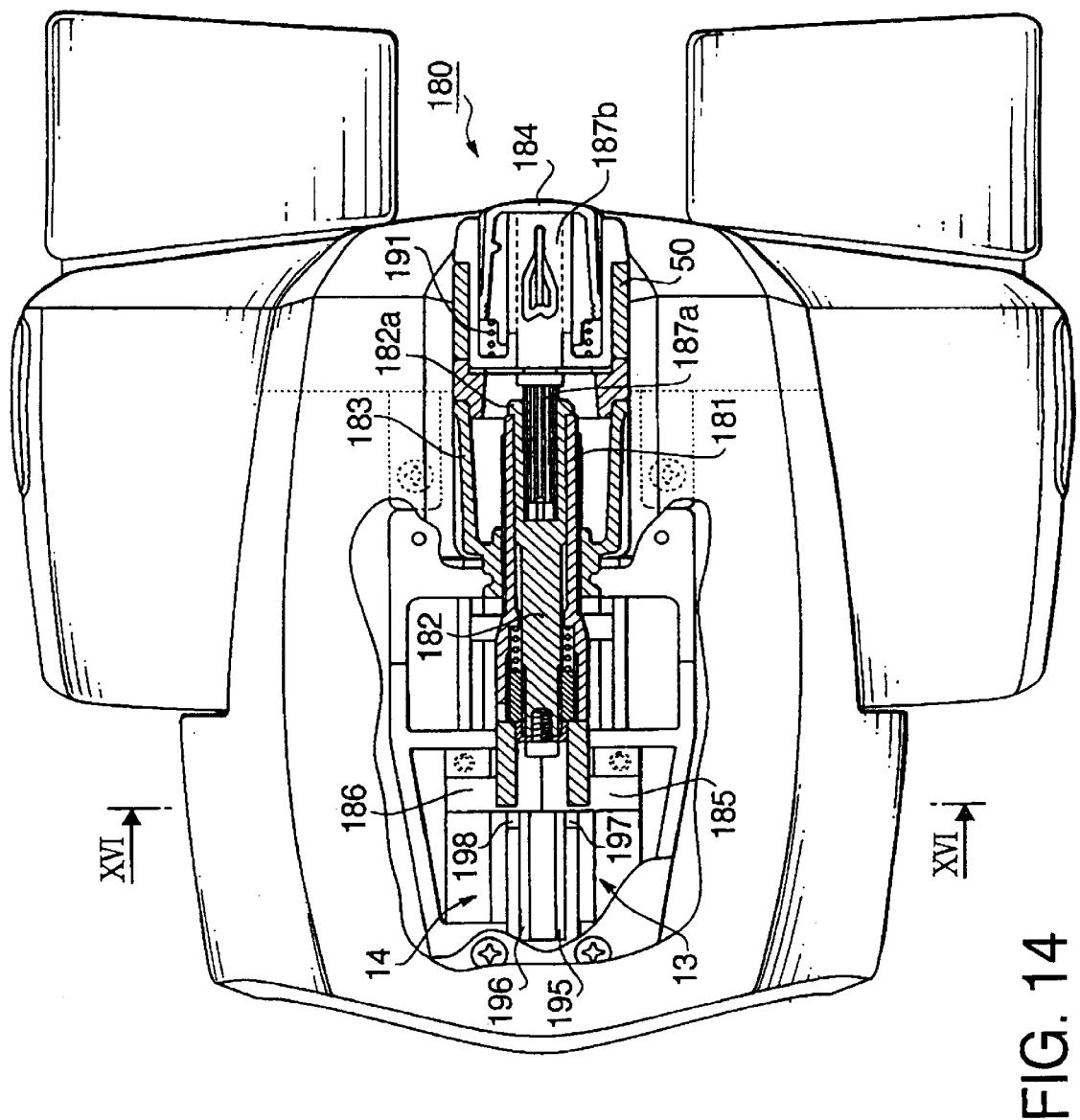
FIG. 14 shows a partially broken away plan view of the binocular.

FIG. 14 is a plan view of the binocular 10, partially broken away. FIG. 15 is an exploded view of a first actuator 181 and a second actuator 182.

Figure 15:
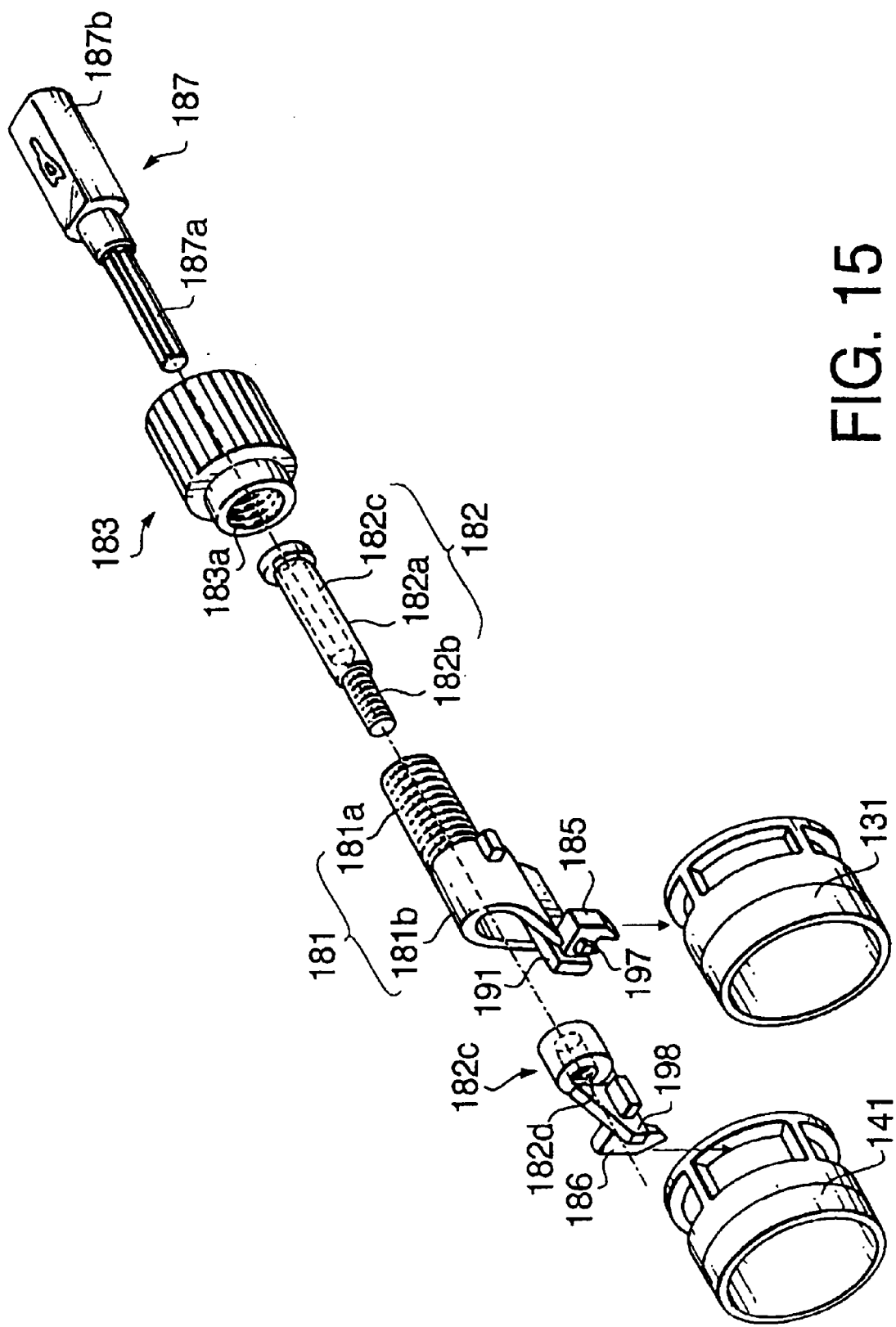
FIG. 15 shows an exploded view of a focus activator and a second actuator.

As is shown in FIG. 14 and FIG. 15, the first actuator 181 is provided for transmitting the rotation of the focus adjusting knob 183 to create the axial movement of object frames 131 and 141. The second actuator 182 is provided, passing through an internal hole axially formed in the first actuator 181, for transmitting the rotation of the diopter correction knob 164 to create the axial movement of the right object frame 141 relative to the left object frame 131.

The first actuator 181 includes a threaded portion 181*a*, which engages with an internal thread 183*a* provided to the focus adjusting knob 183, and a head portion 181*b* that includes a left arm 185 for engaging the left object frame 131, and a center bar 191 axially extending towards the front of the binocular 10. The arm 185 includes a slider 197 for guiding the movement of the arm 185.

The second actuator 182 includes a rod 182*a* and a head part 182*c*. The rod 182*a* includes an external thread 182*b* which engages with an internal thread 182*d* of the head part 182*c*. The head part 182*c* also includes a right arm 186 for engaging the right object frame 141. The right arm 186 has a slider 198 for guiding the movement of the right arm 186.

Figure 16:
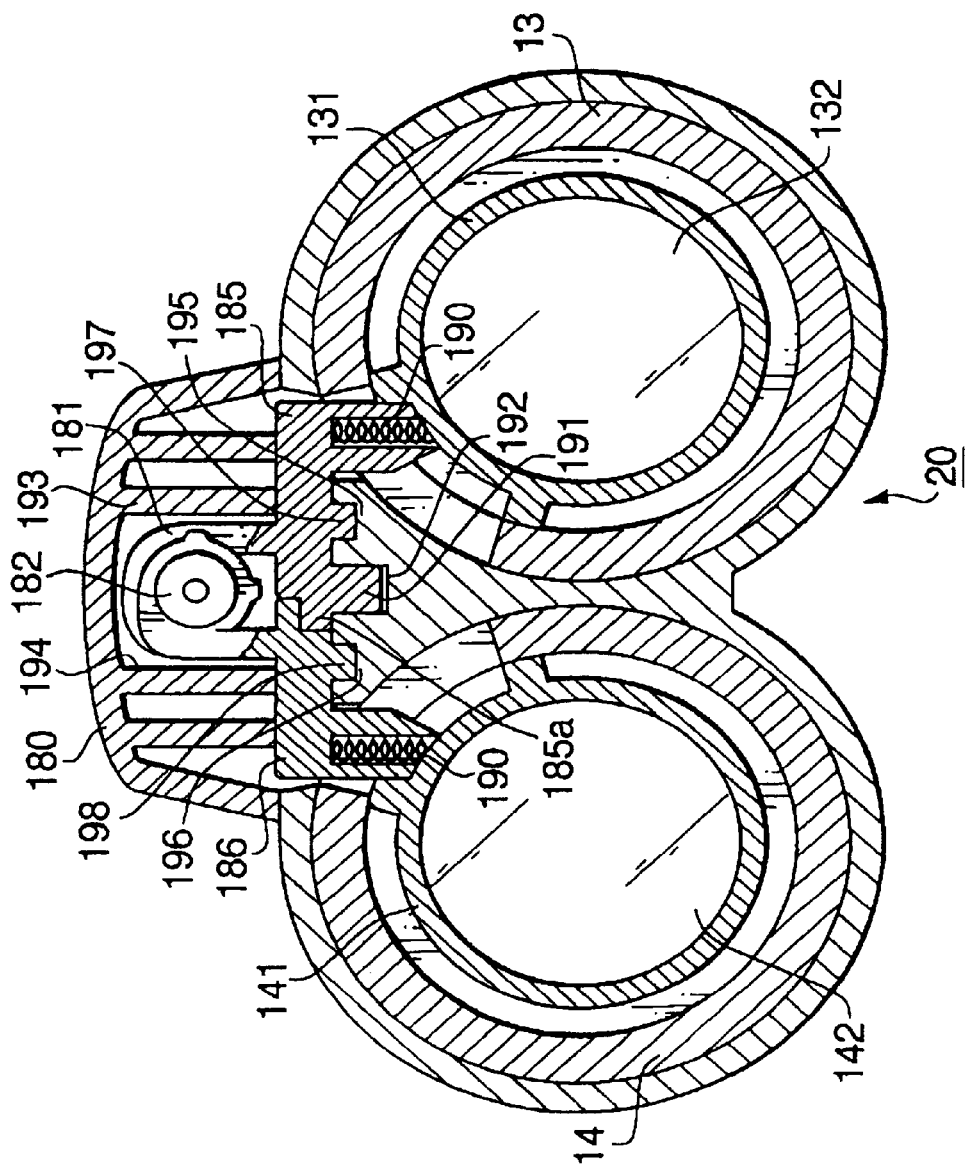
FIG. 16 shows a sectional view taken on line XVI—XVI in FIG. 14.

FIG. 16 is a sectional view taken on line XVI—XVI in FIG. 14. The center bar 191 of the first actuator 181 is guided by a center rail 192 formed on the front frame 20. The sliders 197 and 198 of the left and right arms 185 and 186 are respectively guided by a pair of rails 195 and 196 axially formed on the front frame 20. Further, the left arm 185 has a rail 185*a* by which the right arm 186 is axially guided and the right arm 186 is axially movable with respective to the left arm 185.

The left and right arms 185 and 186 are respectively held in place from above by regulating members 193 and 194 provided to the upper cover 180. As shown in FIG. 16, two springs 190 are respectively provided between the left and right arm 185 and 186 for forcing the object frames 131 and 141 downward in order to regulate the vertical position of the object frames 131 and 141.

Further, as shown in FIG. 15, a rear shaft 187 is provided at the rear side of the first actuator 181, for rotating the second actuator 182 (FIG. 14). The rear shaft 187 includes a spline 187*a* and a shaft portion 187*b*. The spline 187*a* engages an internal spline 182*e* formed in the second actuator 182.

Rotating the focus adjusting knob 183 axially moves the first actuator 181 by the engagement of the internal screw 183*a* and the threaded portion 181*a*, which then axially moves the right and left object frames 131 and 141.

Rotating the diopter correction knob 184 (FIG. 13) rotates the screw portion 182*b* of the second actuator 182, which then axially moves the head portion 182*c* thereby axially moving the right object frame 141 with respect to the left object frame 131.

The diopter correction knob 184 is designed to be stored in a retracted position when not in use. As shown in FIG. 13, the shaft portion 187*b* of the rear shaft 187 is supported by a cap member 184*b* so that the rear shaft 187 is axially movable but not rotatable with respect to the cap member 184*b*. The shaft portion 187*b* includes a flat portion which has a cam groove 188 formed thereon. A spring 189 is provided to the cap member 184*b*. One end of the spring 189 is fixed to the cap member 184*b* and the other end of the spring 189 is set into the cam groove 188.

Figure 17A:
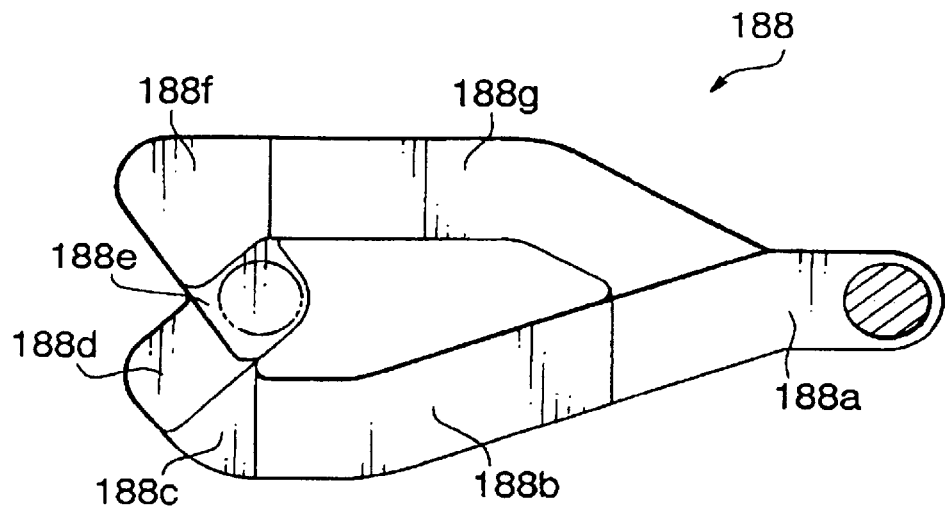
FIGS. 17A and 17B show two views of a cam groove.
Figure 17B:
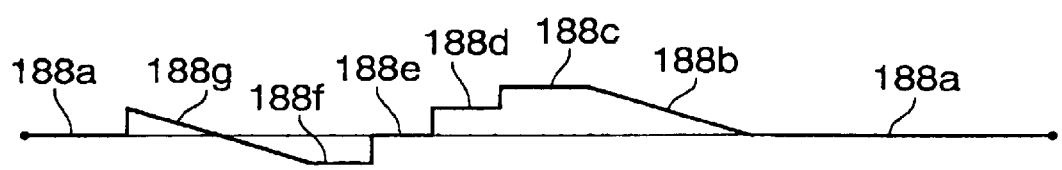

FIG. 17A and FIG. 17B are, respectively, a plan view and a diagrammatic view showing the cam groove 188. The cam groove 188 is shaped as a path, proceeding from a holding portion 188*a* through a rising portion 188*b*, across a flat portion 188*c*, down a ledge (vertical drop) between flat portion 188*c* and a next flat portion 188*d*, turning through a predetermined angle in flat portions 188*c* and 188*d* and down another ledge between portion 188*d* and holding recess portion 188*e*. The path returns from the holding recess portion 188*e* by first proceeding down yet another ledge between the holding recess portion 188*e* and a reversing portion 188*f* in which the path turns through a predetermined angle, then proceeding along rising return portion 188*g*, and finally down another ledge between the return portion 188*g* and the holding portion 188*a*. Thus, the path is shaped to allow the operation described below.

In operation, starting from the operating position (in use position), the diopter correction knob 184 is pressed in (that is, toward the front of the binocular 10) against the bias of the return spring 191, the tip of the spring member 189 follows the cam groove 188, and passes over the first two ledges along the path (creating a clicking sound), and then is released at the limit of movement, thus settling in the holding recess portion 188*e*. The diopter correction knob 184 is then held stable in a retracted position by the engagement of the tip of the spring 189 with the cam groove 188 at the holding recess portion 188*e*.

The diopter correction knob 184 is then extended by pressing in again against the bias of the return spring 191. The tip of the spring 189 follows the cam groove 188, and passes over the ledges along the return path, before settling in the holding portion 188*a*, at which point the diopter correction knob 184 is released. The diopter correction knob 184 is then held stable in the extended position by the engagement of the tip of the spring 189 with the cam groove 188 at the holding portion 188*a*.

In this way, the diopter correction knob 184 can be stored in the magnifying-power-varying operation knob 50 when not in use.

A fine adjustment mechanism is provided to the rear barrel 31 (32), for fine adjustment of the rotational position of the cam ring 61 (62).

Figure 18A:
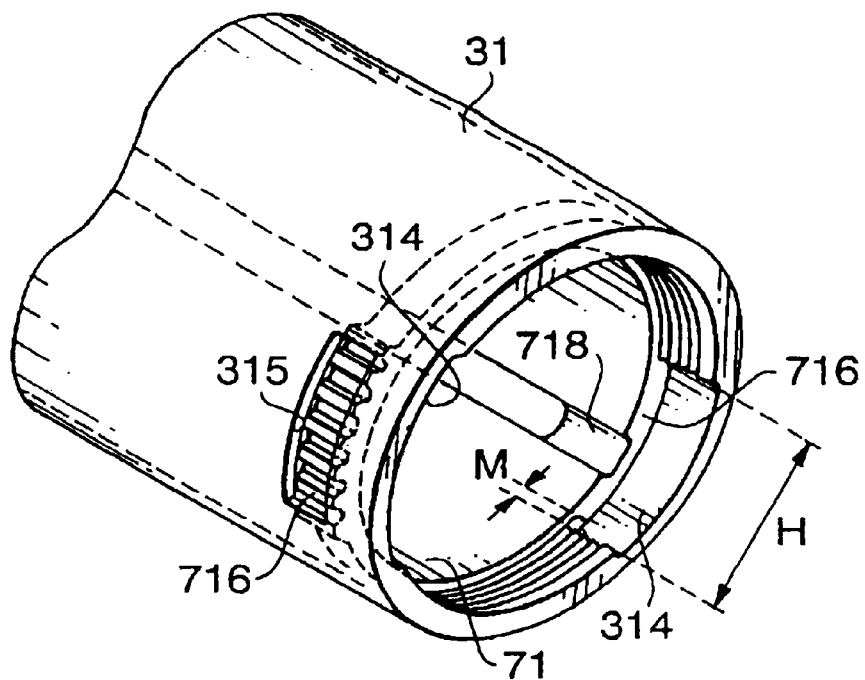
FIGS. 18A and 18B show two views of a rear barrel.

FIGS. 18A and 18D respectively show perspective views of the rear barrel 31 (32) with and without the guide ring 71 (72) inserted. Also referring to FIG. 8, the guide ring 71 (72) has a flange portion 715 (725) at its rear end, which abuts the rear end of the cam ring 61 (62). The flange portion 715 (725) has two sector gears 716 (726) for adjusting the rotational position of the guide ring 71 (72).

Figure 18B:
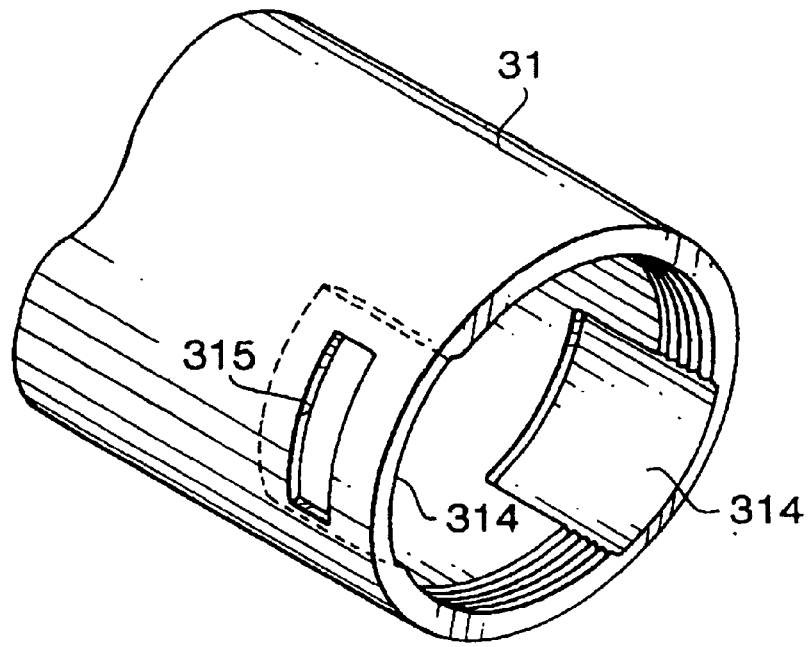

As shown in FIG. 18B, two recesses 314 are formed on the inner surface of the rear barrel 31 (32). As shown in FIG.

18A, the sector gears 716 (726) of the guide ring 71 (72) fit to the recesses 314 (324) of the rear barrel 31 (32). An adjusting margin M is provided between the recesses 314 and the sector gears 716 (726), to allow the sector gears 716 (726) to be rotated for fine adjustment of the rotational position of the guide ring 71 (72). The rear barrel 31 (32) has an opening 315, for operating one of the sector gears 716 (726).

Figure 19:
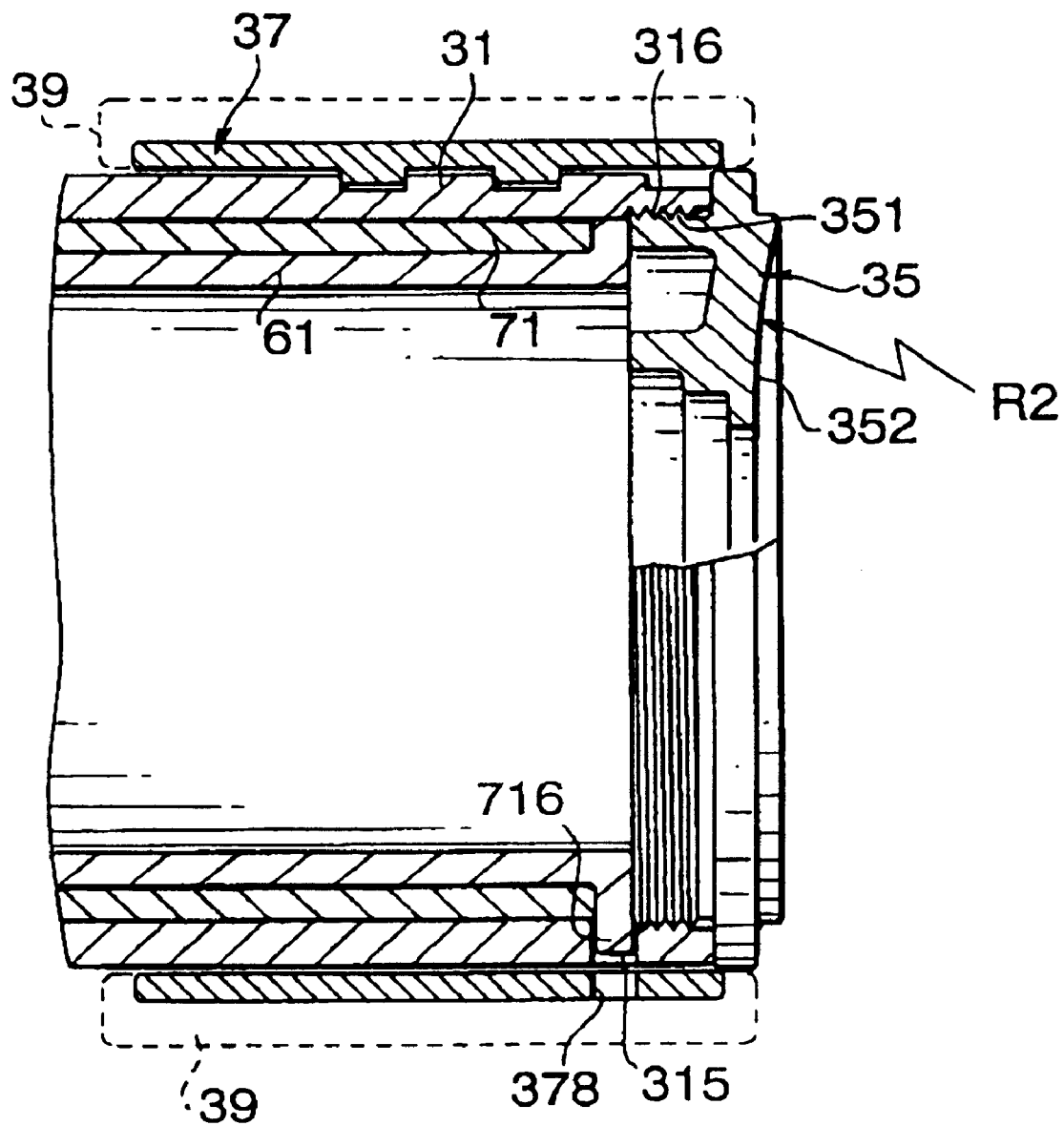
FIG. 19 shows a cross-section of the rear portion of the rear barrel.

FIG. 19 is a cross section of the rear portion of the rear barrel 31 (32). As shown in FIG. 19, the opening 315 is covered by an eye cup 37 having an opening 378 corresponding to the opening 315. The opening 378 is covered by a rubber cover 39, which prevents unintended operation of the fine adjustment mechanism.

The sector gear 716 (726) is easily operated by removing the rubber cover 39, even after the binocular 10 is assembled.

As shown in FIG. 8, when the guide ring 71 (72) is rotated by the operation of the sector gear 716 (726), the guide ring 71 (72) minutely rotates with reference to the cam ring 61 (62). Accordingly, the guide grooves 713 (723) and 718 (728) (FIG. 7A) shift with reference to the cam groove 614 (624) (FIG. 6). Thus, the axial moving range of the lens group 17a (18a) with reference to the rotation of the cam ring 61 (62) can be changed.

Accordingly, the axial movement range of the left and right magnifying-power-varying lens groups 17a and 18a can be adjusted separately.

As shown in FIG. 19, the eyepiece frame 35 (36) is provided to the rear barrel 31 (32), for holding the second lens 114 (124) (FIG. 3). The eyepiece frame 35 (36) is mounted to the rear barrel 31 (32), by engaging a threaded portion 351 (361) of the eyepiece frame 35 (36) to an internal thread 316 (326) formed in the rear barrel 31 (32).

The position of the cam ring 61 (62) and the guide ring 71 (72) are axially fixed by mounting the eyepiece frame 35 (36) to the rear barrel 31 (32).

FIG. 20 is a perspective view of the eye cup 37. The eye cup is identical for both telescope systems and the right rear barrel 32 is not shown. The eye cup 37 is mounted from the rear side of the rear barrel 31 before the eyepiece frame 35 is mounted. The eyepiece frame 35 has a flange portion 353 which has a diameter that is slightly larger than that of the rear barrel 31, and the flange portion 353 acts to secure the eye cup 37.

Figure 21A:
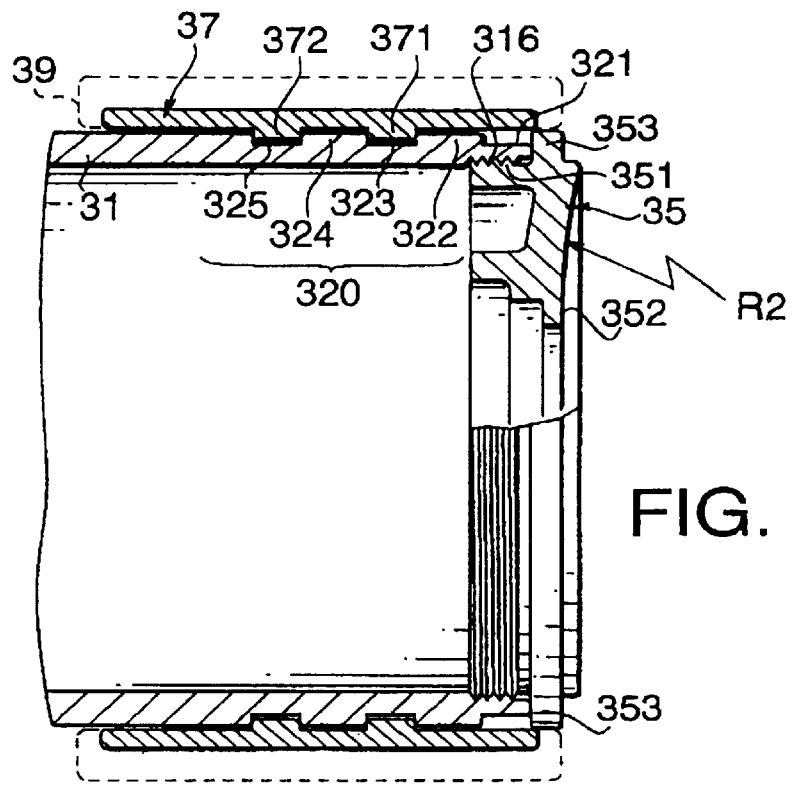
FIGS. 21A and 21B show two views of the rear portion of the rear barrel.
Figure 21B:
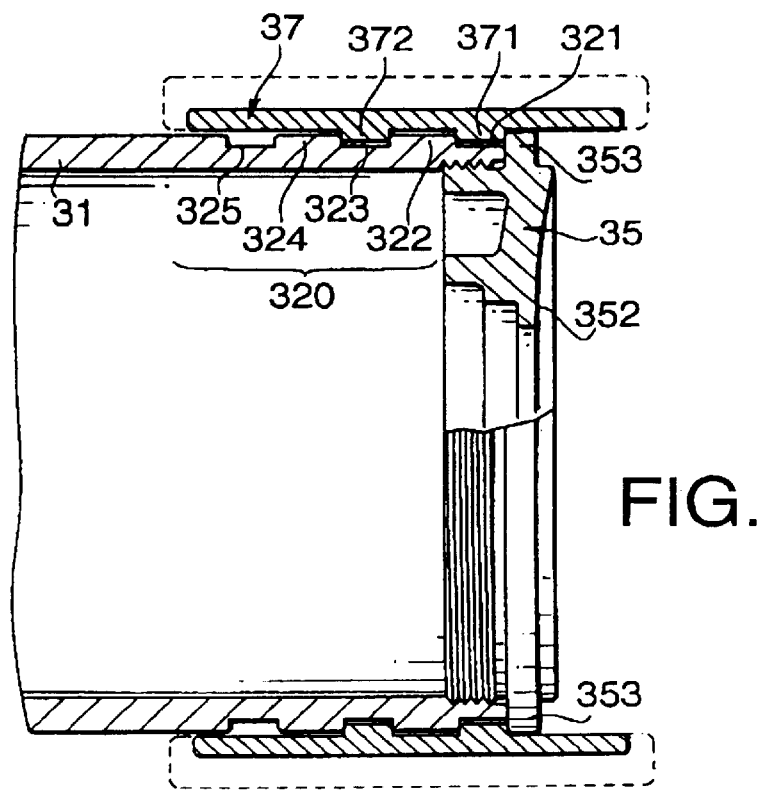

FIG. 21A and FIG. 21B are respectively a cross section of the rear portion of the rear barrel 31. Two rectangular protrusions 371 and 372 are formed on the eye cup 37, and three rectangular indentations 321, 323 and 325 separated by lands 322 and 32 are formed in a groove 320 on the rear barrel 31, so that the two rectangular protrusions 371 and 372 can selectively fit in two of the three rectangular indentations 321, 323 and 325. The protrusions 371 and 372 and the indentations 321, 323 and 325 are rectangle shaped.

Figure 22:
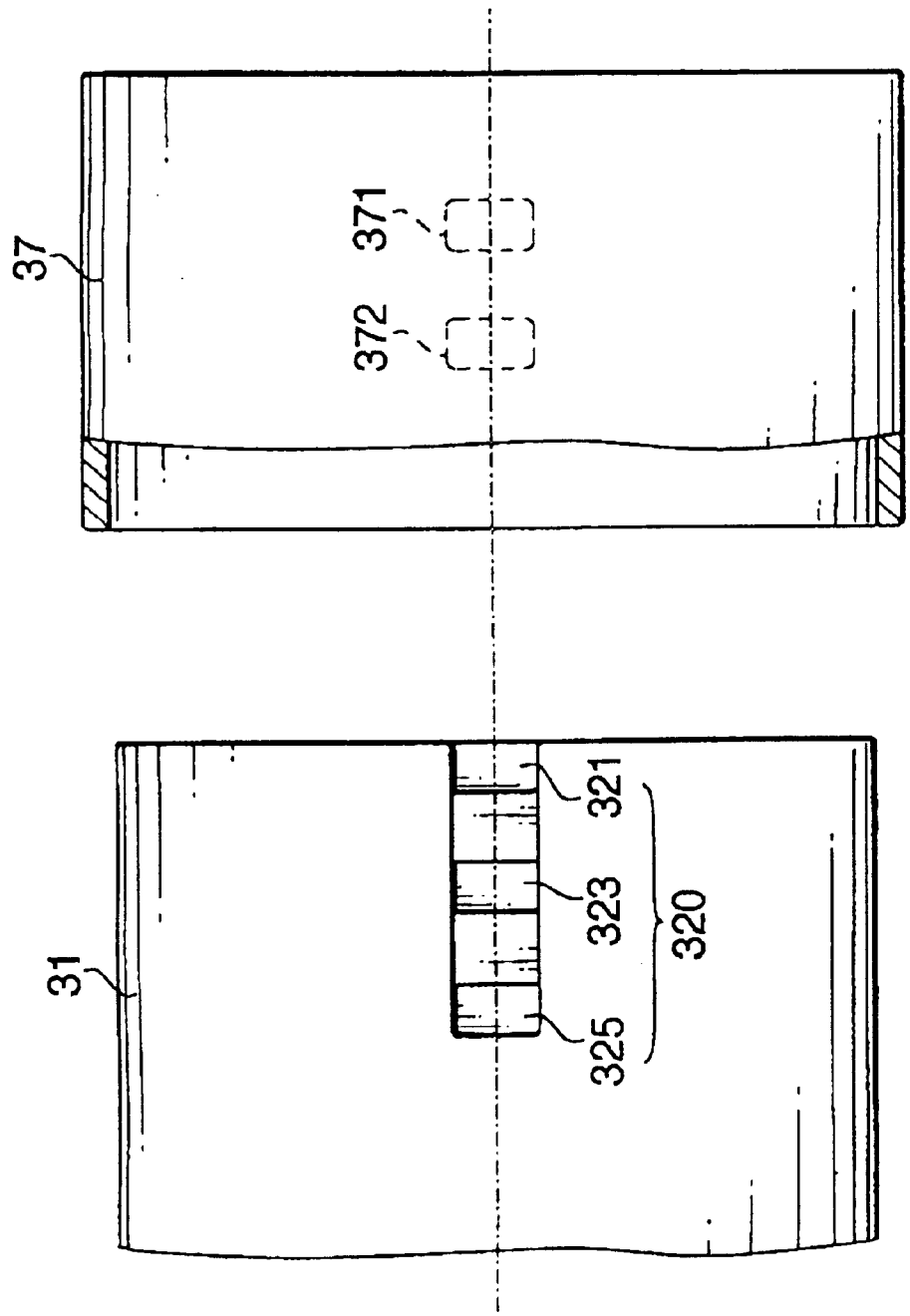
FIG. 22 shows a plan view of the eye cup.

FIG. 22 is a plan view of the eye cup 37. The indentations 321, 323 and 325 are formed in a groove 320 having the same width as the indentations 321, 323 and 325, which is the same as the width of the protrusions 371 and 372.

When the protrusions 371 and 372 engage the indentations 321 and 323, the eye cup 37 projects from the rear barrel 31 as shown in FIG. 21B, and when the protrusions 371 and 372 engage the indentations 323 and 325, the eye cup is stored as shown in FIG. 21A. As constructed above, the eye cup 37 can be securely held in either position.

As shown in FIG. 21A, an eyepiece surface 352 of the eyepiece frame 35 is shaped with a curvature radius R2 in order to avoid interference between the eyepiece surface 352 and a user's spectacles. The curvature radius R2 is a predetermined value that is based on a typical curvature radius of spectacle lenses. In the embodiment, the curvature radius R2 is set to 100 mm.

Figure 23:
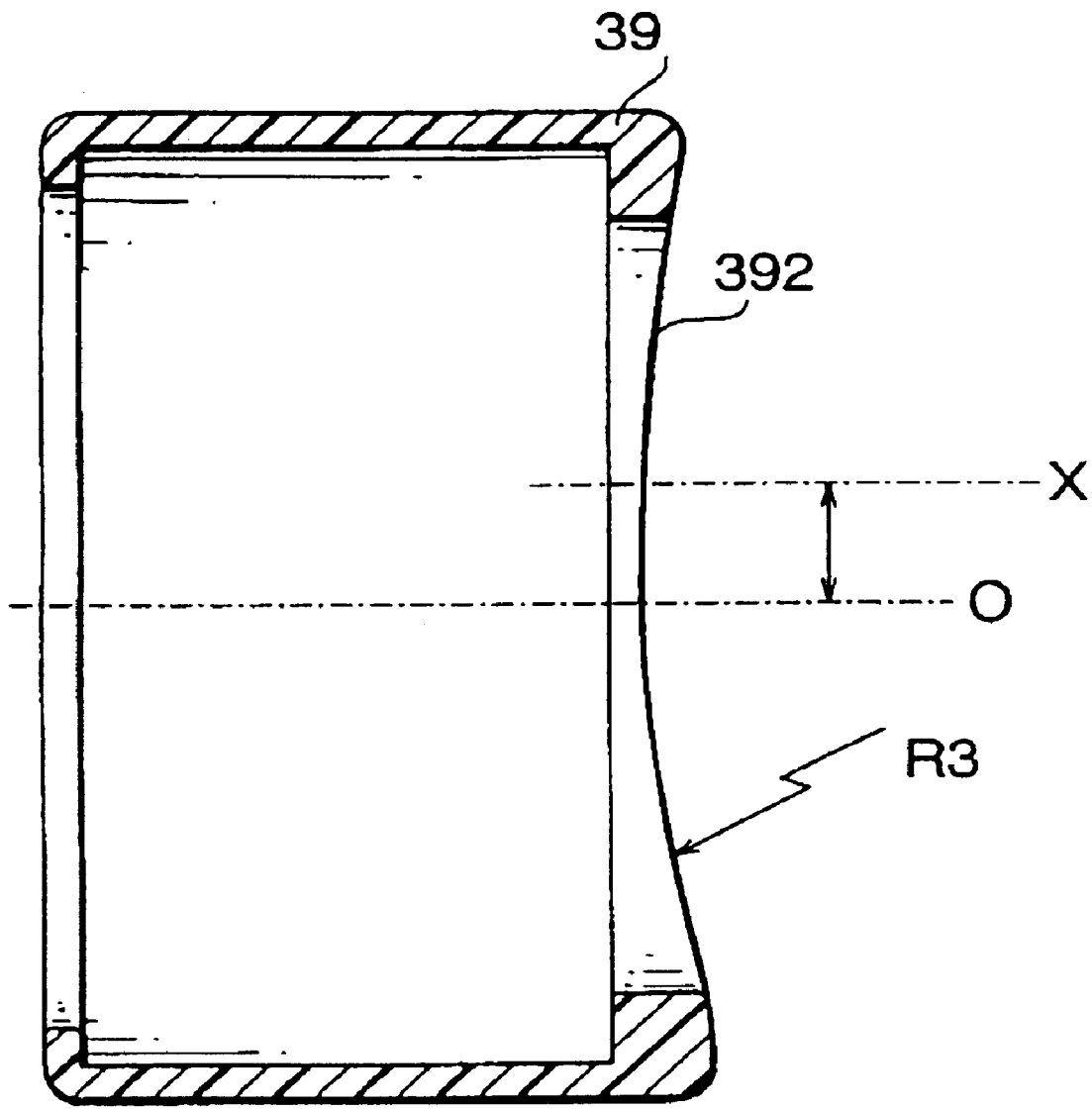
FIG. 23 shows a cross-section of an eyepiece rubber.

As shown in FIG. 21A, the eyepiece rubber 39 is mounted to the eye cup 37. FIG. 23 is a cross section of the eyepiece rubber 39. As shown in FIG. 23, the surface 392 of the eyepiece rubber 39 has a curvature radius R3 with a center of curvature X that is positioned at a distance S from the optical axis O. This offset curvature radius R3 allows the eyepiece rubber 39 to shield the user's eye from ambient light.

Although the structure and operation of a binocular is described herein with respect to the preferred embodiments, many modifications and changes can be made without departing from the spirit and scope of the invention.

Figure 24A:
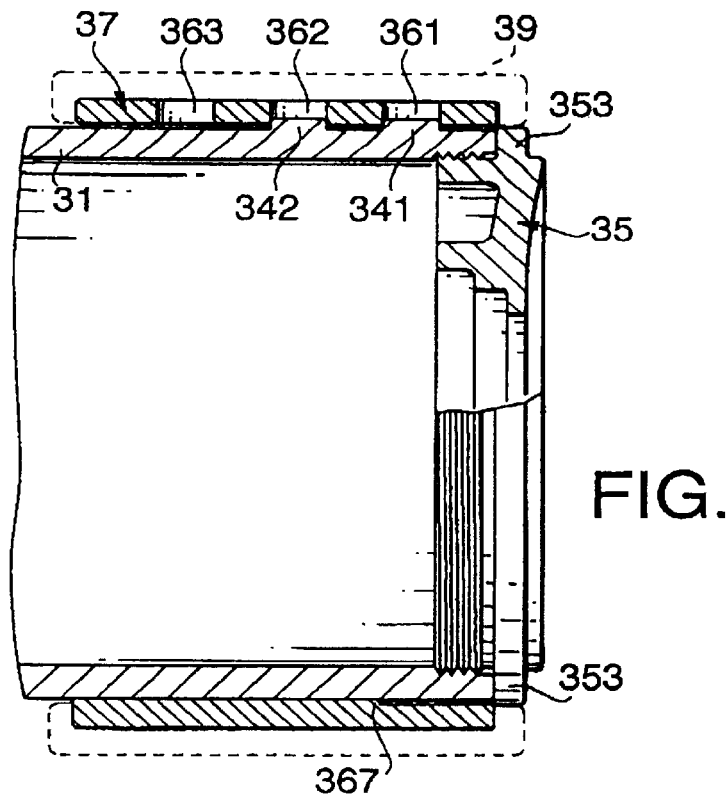
FIGS. 24A and 24B show two views of an alternative arrangement for the eye cup.
Figure 24B:
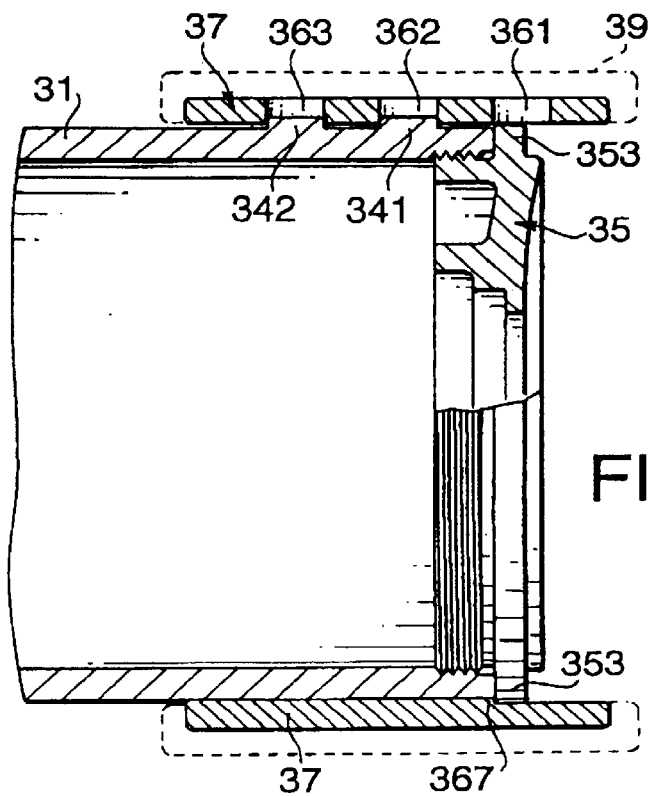

FIG. 24A and FIG. 24B show an alternative arrangement of the left rear barrel 31 (similar for the right rear barrel 32) and the eye cup 37. In this arrangement, three openings 361, 362 and 363 are formed on the eye cup 37, and two protrusions 341 and 342 are formed on the rear barrel 31, such that the two protrusions 341 and 342 can selectively fit into two of the three openings 361, 362 and 363. As can be seen in FIG. 24B, the eyepiece frame 35 has a flange portion 353 which has a diameter that is slightly larger than that of the rear barrel 35. The flange portion 353 of the eyepiece frame 35 acts to secure the eyecup 37 to the eyepiece frame 35 by abutting against shoulder 367 of the eyecup 37.

Figure 25:
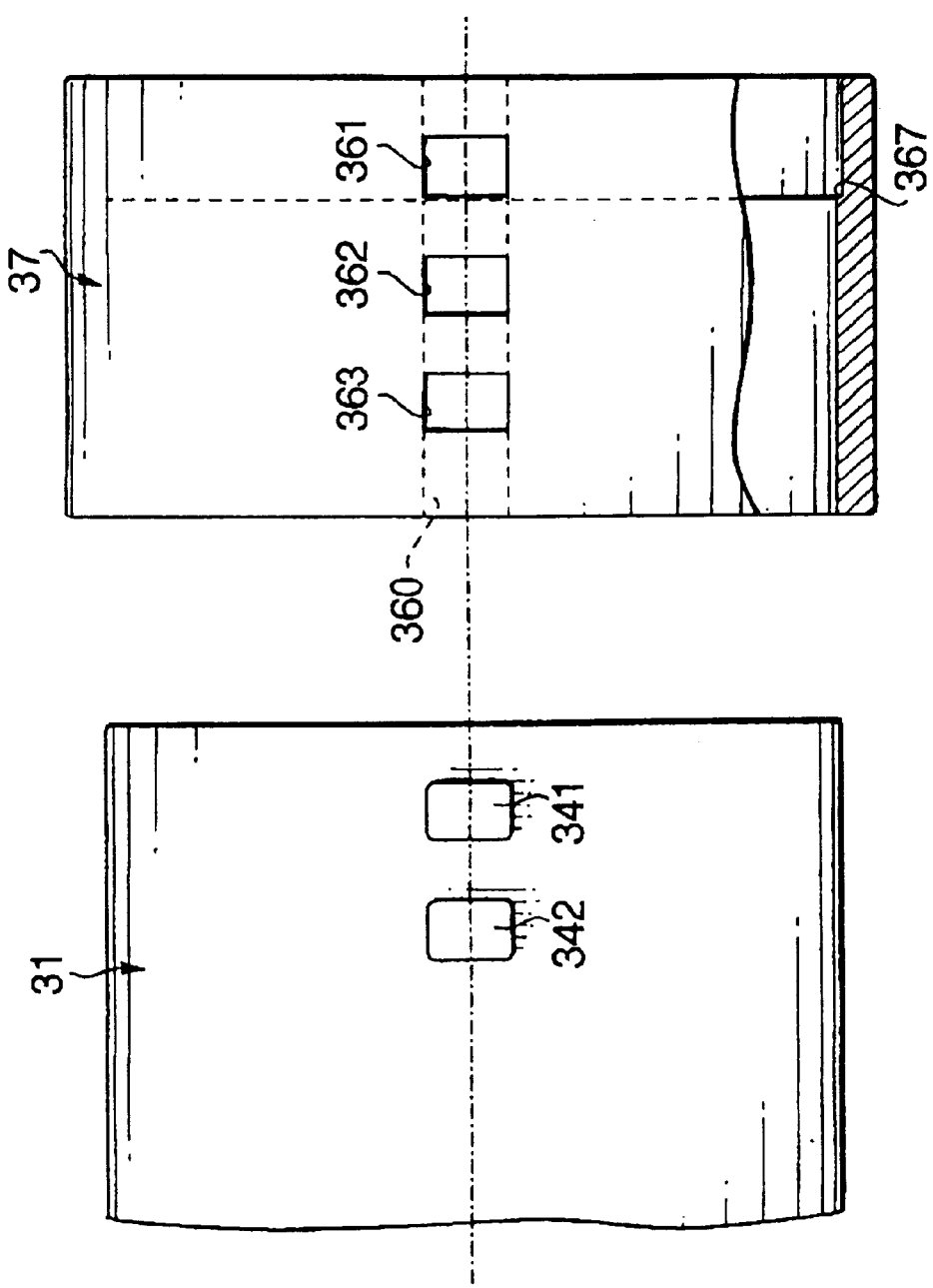
FIG. 25 shows a plan view of the eye cup and the rear portion of the rear barrel.

FIG. 25 is a plan view of an eye cup 37 and the rear portion of the rear barrel 31. The protrusions 341 and 342 and the three openings 361, 362 and 363 are rectangular shaped. The three openings 361, 362 and 363 are formed in a groove 360 having the same width as the openings 361, 362 and 363 and also the same as the width of the protrusions 341 and 342.

When the protrusions 341 and 342 respectively engage openings 362 and 363, the eye cup projects from the rear barrel 31 as shown in FIG. 24B, and when the protrusions 341 and 342 engage the openings 361 and 362, the eye cup is stored as shown in FIG. 24A. As such, the eye cup 37 can be securely held in either position.

What is claimed is:

1. A binocular comprising:
    a locking mechanism for locking an eye cup to a barrel of a binocular, wherein at least three indentations are formed on one of an outer surface of said barrel and an inner surface of said eye cup, and two protrusions are formed on the other of said outer surface of said barrel and said inner surface of said eye cup, and further wherein said eye cup can be secured in a predetermined position by the engagement of said two protrusions and two of said three indentations.

2. The binocular according to claim 1, wherein said indentations are formed in a groove having the same width as said indentations, said groove regulating a position, in a circumferential direction, of said eye cup.

3. The binocular according to claim 2, said binocular further comprising a flange portion that is provided to an eyepiece frame to act as a stopper for said eye cup.

* * * * *